United States Patent [19]

Nakao et al.

[11] Patent Number: 5,359,434
[45] Date of Patent: Oct. 25, 1994

[54] SCANNING OPTICAL APPARATUS

[75] Inventors: Hideyuki Nakao, Kawasaki; Yuzo Koike, Yokohama; Tutomu Saito, Yokohama; Shuzo Hirahara, Yokohama; Masafumi Mori, Tokyo, all of Japan

[73] Assignee: Kabushiki Kaisha Toshiba, Kawasaki, Japan

[21] Appl. No.: 858,022

[22] Filed: Mar. 26, 1992

[30] Foreign Application Priority Data

| Mar. 26, 1991 | [JP] | Japan | 3-061665 |
| Jul. 12, 1991 | [JP] | Japan | 3-197283 |
| Nov. 29, 1991 | [JP] | Japan | 3-339447 |

[51] Int. Cl.⁵ .................. G02B 26/10; H04N 1/04
[52] U.S. Cl. .................. 358/481; 358/296; 358/494; 358/288; 346/108
[58] Field of Search .......... 358/481, 293, 296, 494, 358/288, 51, 213, 19, 260, 208, 199, 206, 285; 346/108, 76 L, 160, 136, 107 R; 250/204, 578

[56] References Cited

U.S. PATENT DOCUMENTS

| 4,247,762 | 1/1981 | Wilwerding | 250/204 |
| 4,307,930 | 12/1981 | Saito | 350/6.6 |
| 4,404,596 | 9/1983 | Juergensen et al. | 358/293 |
| 4,514,739 | 4/1985 | Johnson et al. | 358/208 |
| 4,515,462 | 5/1985 | Yoneda . | |
| 4,701,626 | 10/1987 | Ishizaki et al. | 358/213.19 |
| 4,733,308 | 3/1988 | Nakamura et al. | 358/288 |
| 4,761,662 | 8/1988 | Yoshimoto et al. . | |
| 5,012,089 | 4/1991 | Kurusu et al. | 358/494 |
| 5,081,525 | 1/1992 | Akiyama et al. | 358/51 |
| 5,187,495 | 2/1993 | Tanimoto et al. | 346/108 |
| 5,204,523 | 4/1993 | Appel et al. | 358/481 |
| 5,264,869 | 11/1993 | Appel et al. | 346/108 |
| 5,268,687 | 12/1993 | Peled et al. | 346/108 |
| 5,287,125 | 2/1994 | Appel et al. | 346/108 |

FOREIGN PATENT DOCUMENTS

| 0183165 | 6/1986 | European Pat. Off. . |
| 3445751 | 8/1985 | Fed. Rep. of Germany . |
| 64974 | 1/1989 | Japan . |

OTHER PUBLICATIONS

Xerox Disclosure Journal, vol. 15, No. 6, Dec. 11, 1990, pp. 455-461, J. Fantuzzo, et al., "Raster Output Scanner".

Patent Abstracts of Japan, vol. 11, No. 284 (E-540), Sep. 12, 1987, JP-A-62 081 873, Apr. 15, 1987.

*Primary Examiner*—Paul IP
*Attorney, Agent, or Firm*—Oblon, Spivak, McClelland, Maier & Neustadt

[57] ABSTRACT

A scanning optical apparatus is used as a recording apparatus having an optical system and a mechanical system and effecting desired recording on a photoconductor by irradiation of a beam. The apparatus comprises marks confirming the beam scanning position on the photoconductor, an error detecting unit for detecting the error of the scanning position from the optimal scanning position, which error is due to an optical factor or a mechanical factor, and a control unit for suitably correcting the scanning position of the beam in real time on the basis of a signal representing the detected error.

13 Claims, 42 Drawing Sheets

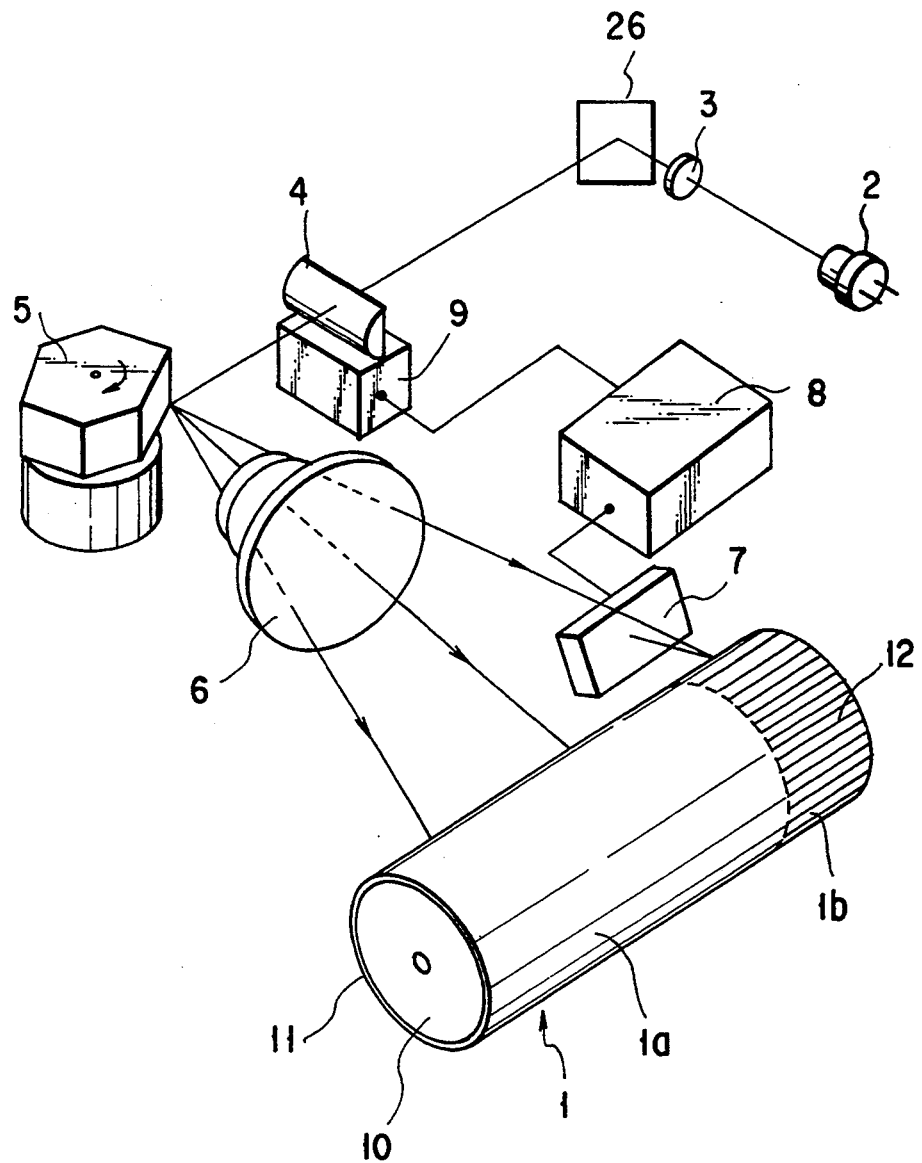
F I G. 1

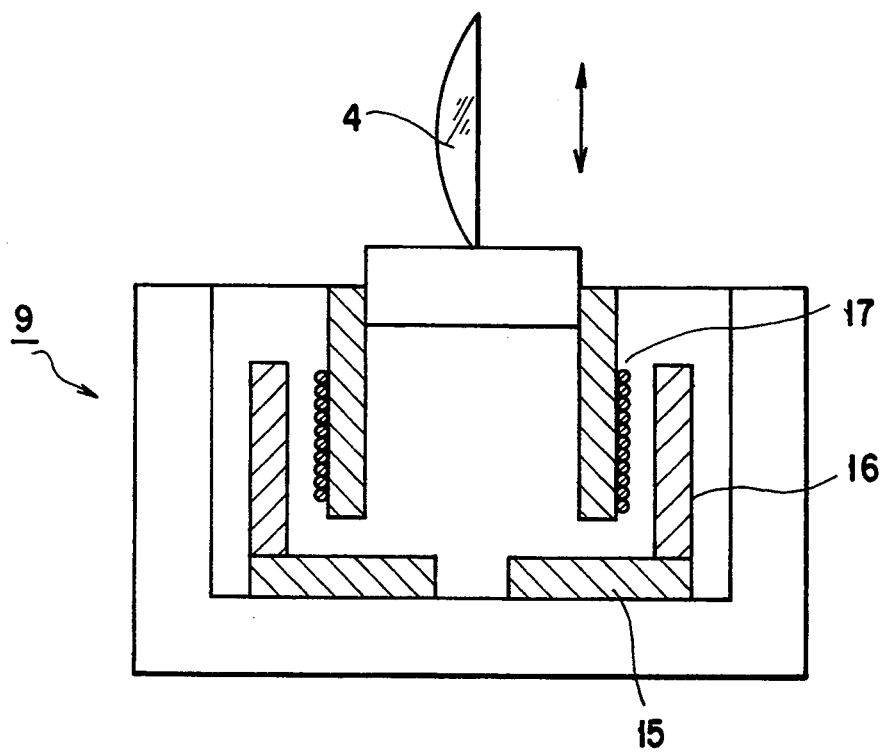
F I G. 3

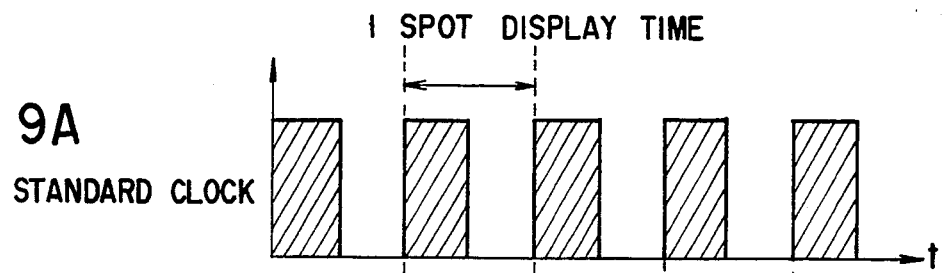
FIG. 9A STANDARD CLOCK
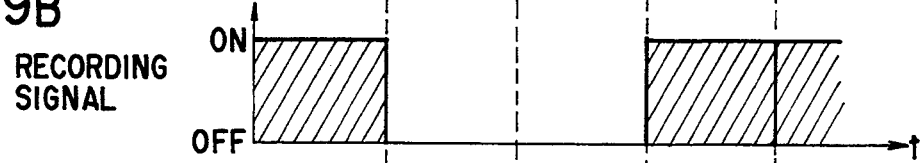
FIG. 9B RECORDING SIGNAL
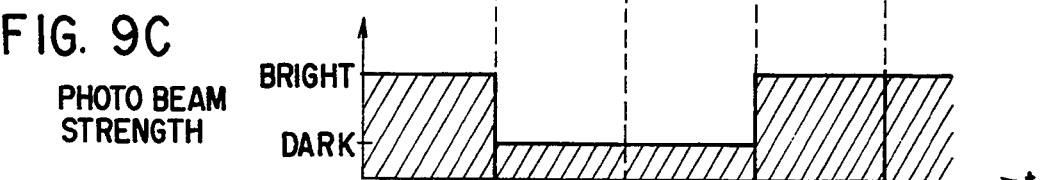
FIG. 9C PHOTO BEAM STRENGTH
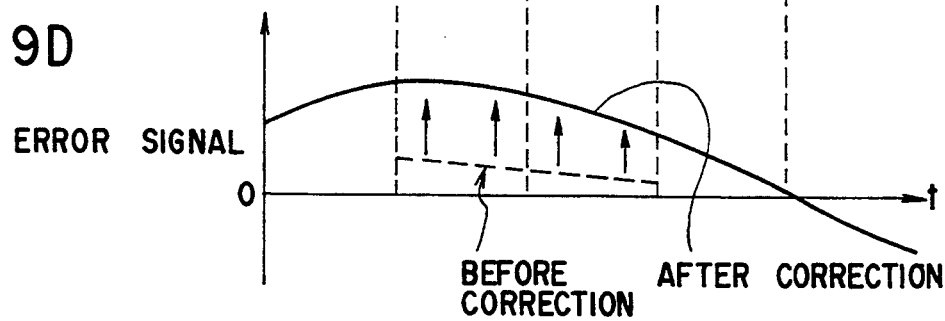
FIG. 9D ERROR SIGNAL

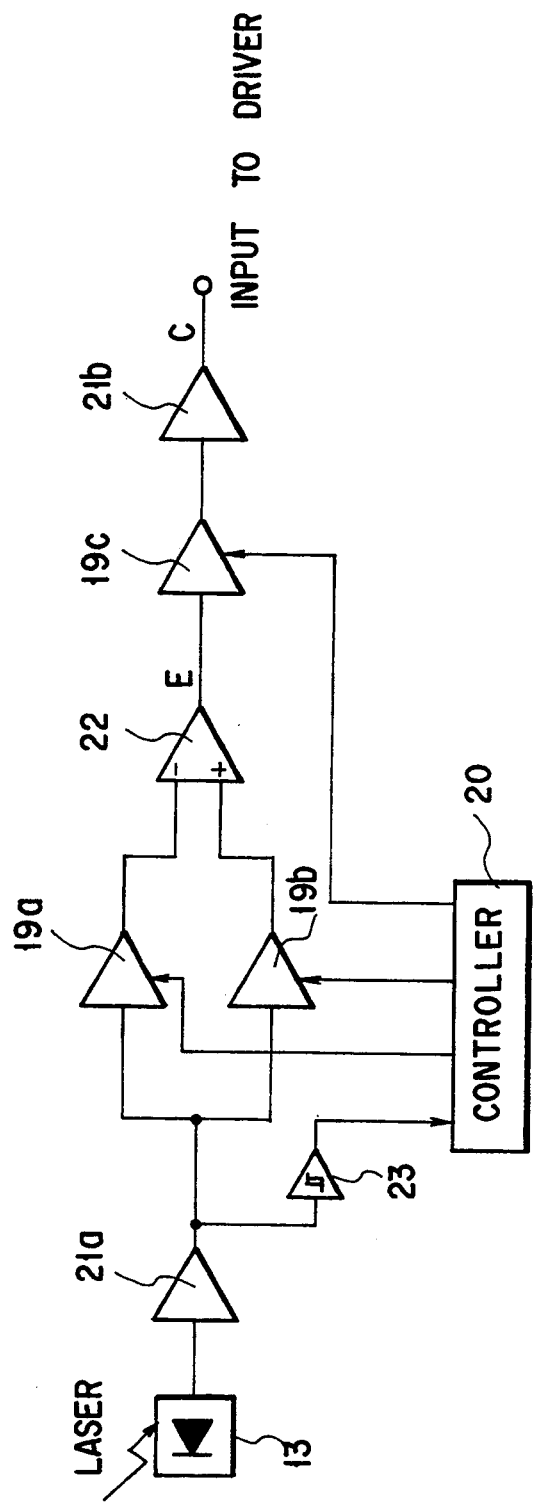
F I G. 12

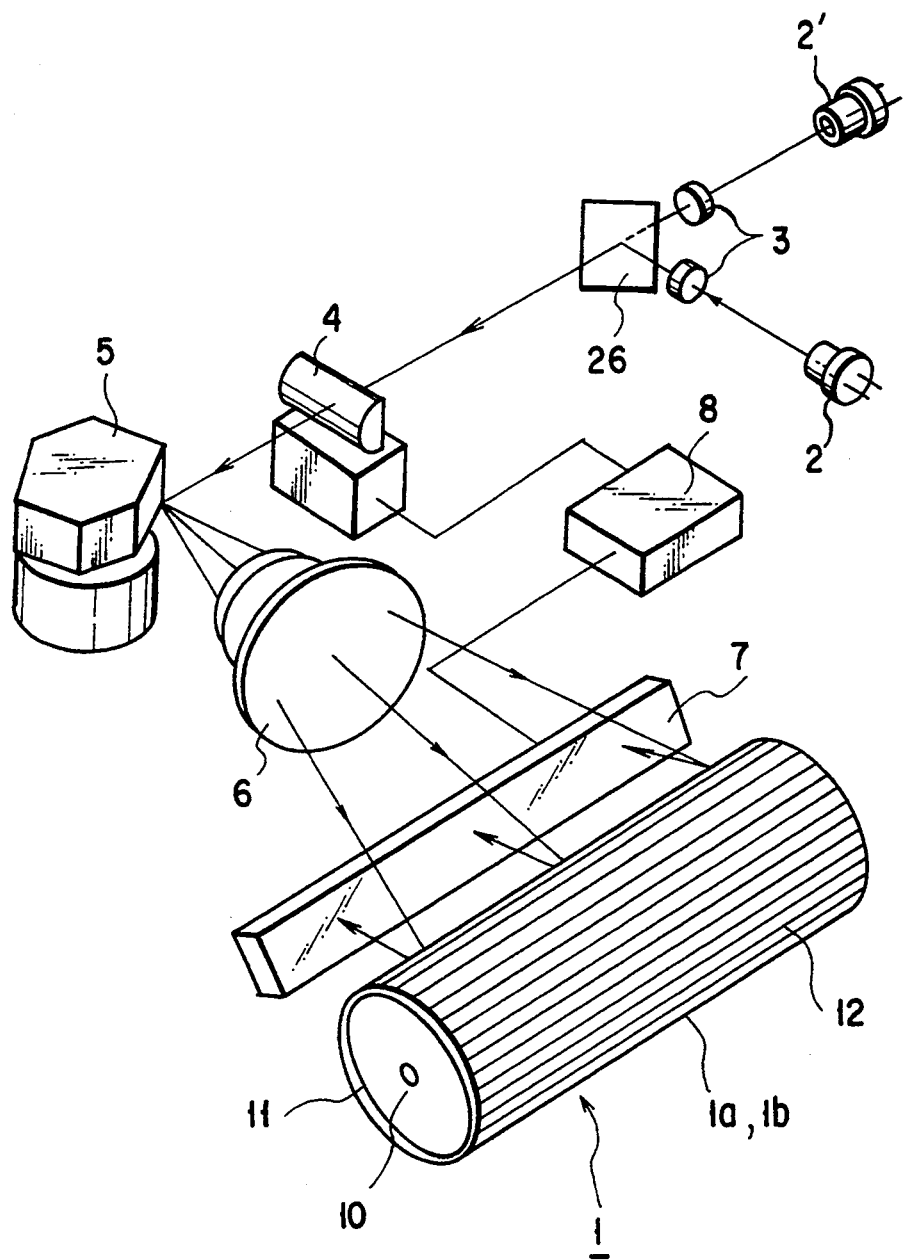
F I G. 17

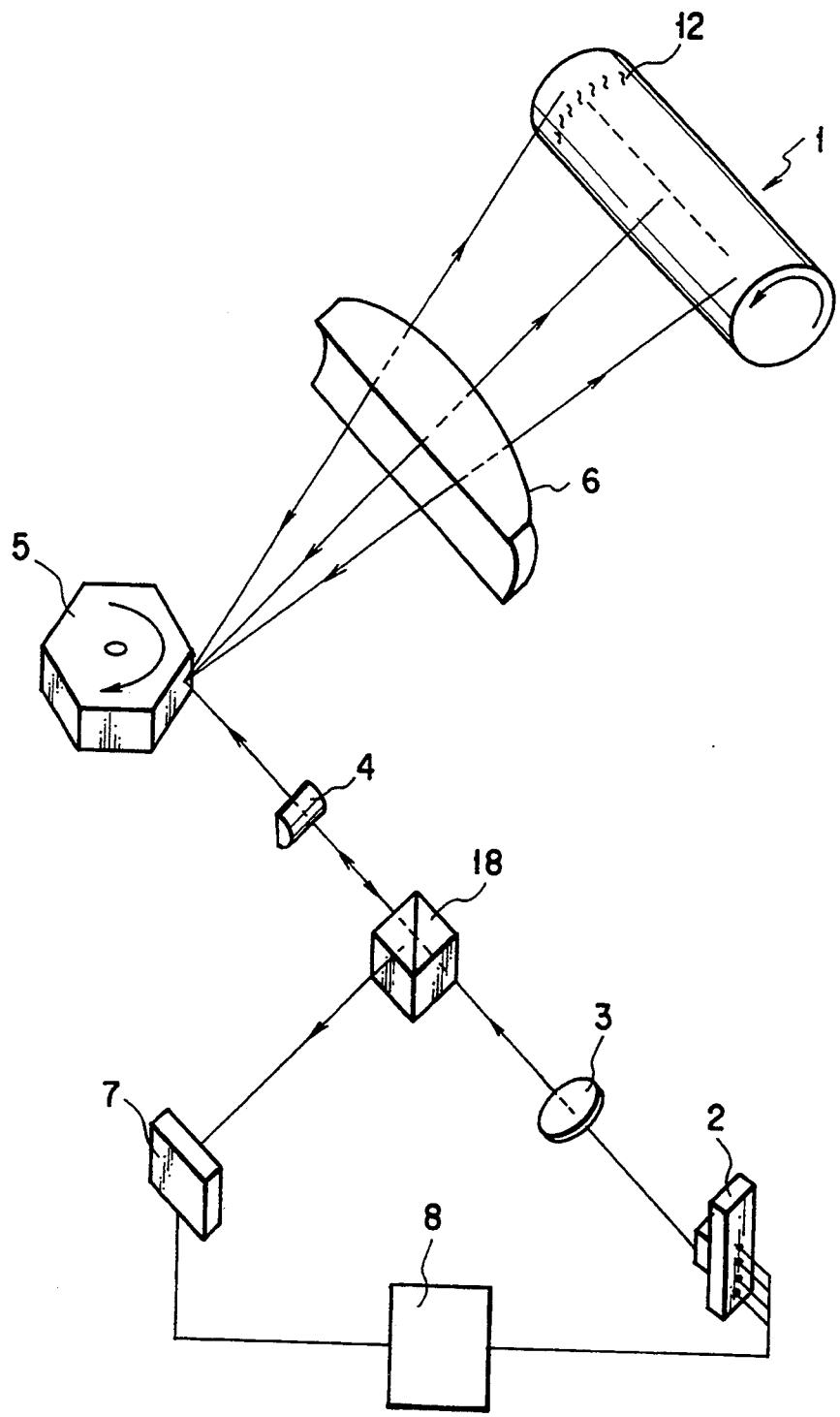
F I G. 18

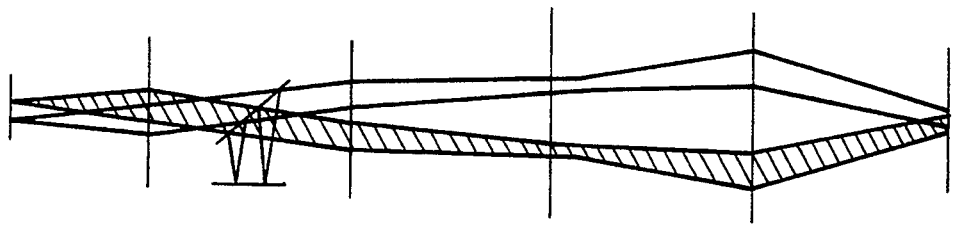
F I G. 19A
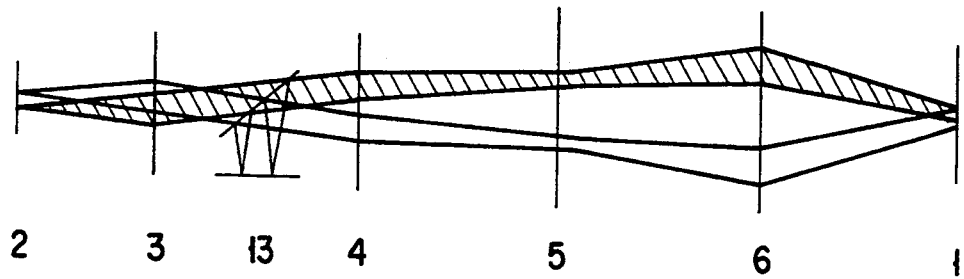
F I G. 19B

FORMING OF BEAMSPOT BY CONTROLLING LIGHT QUANTITY

FORMING OF BEAMSPOT BY LIMITING DRIVING TIME

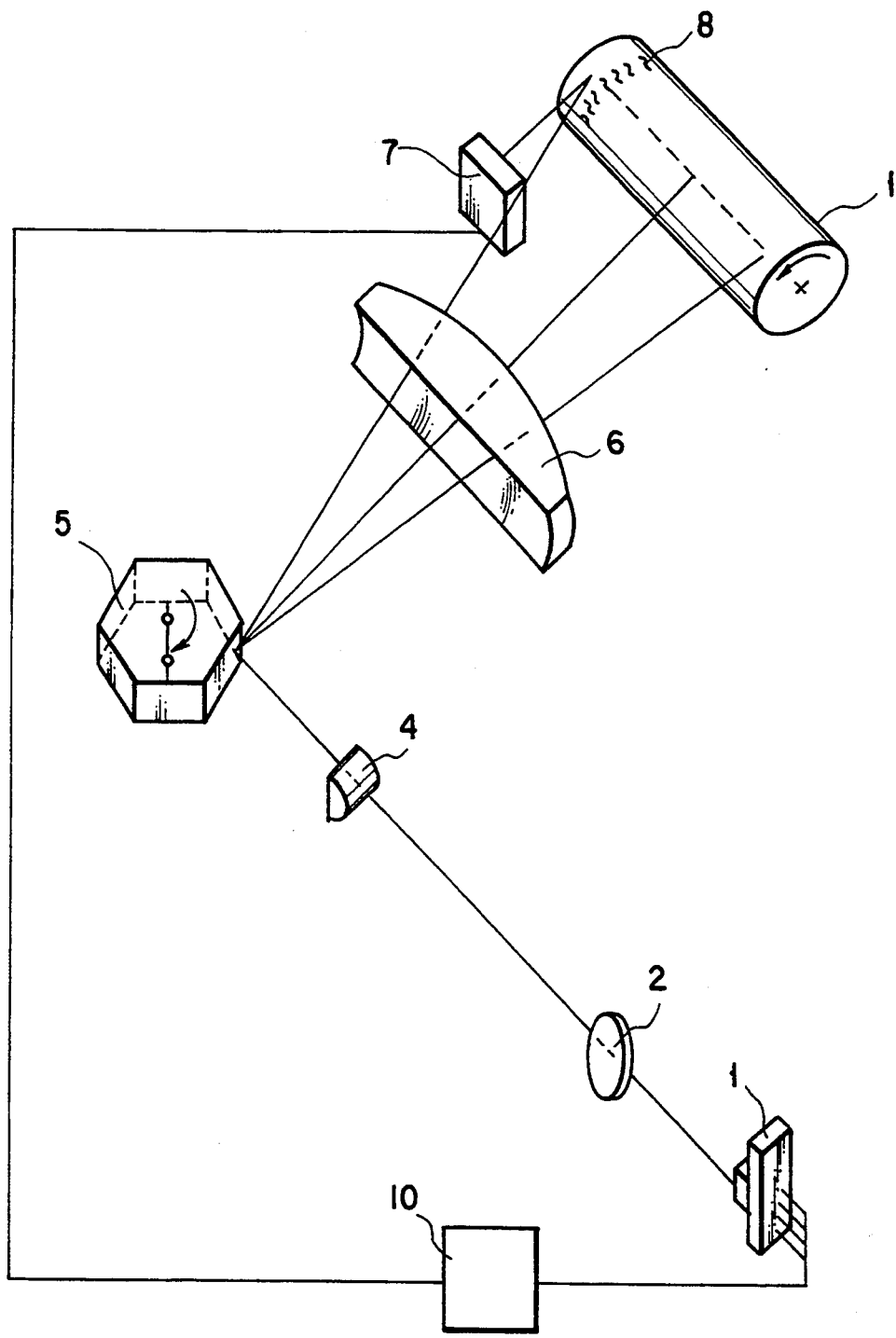
F I G. 25

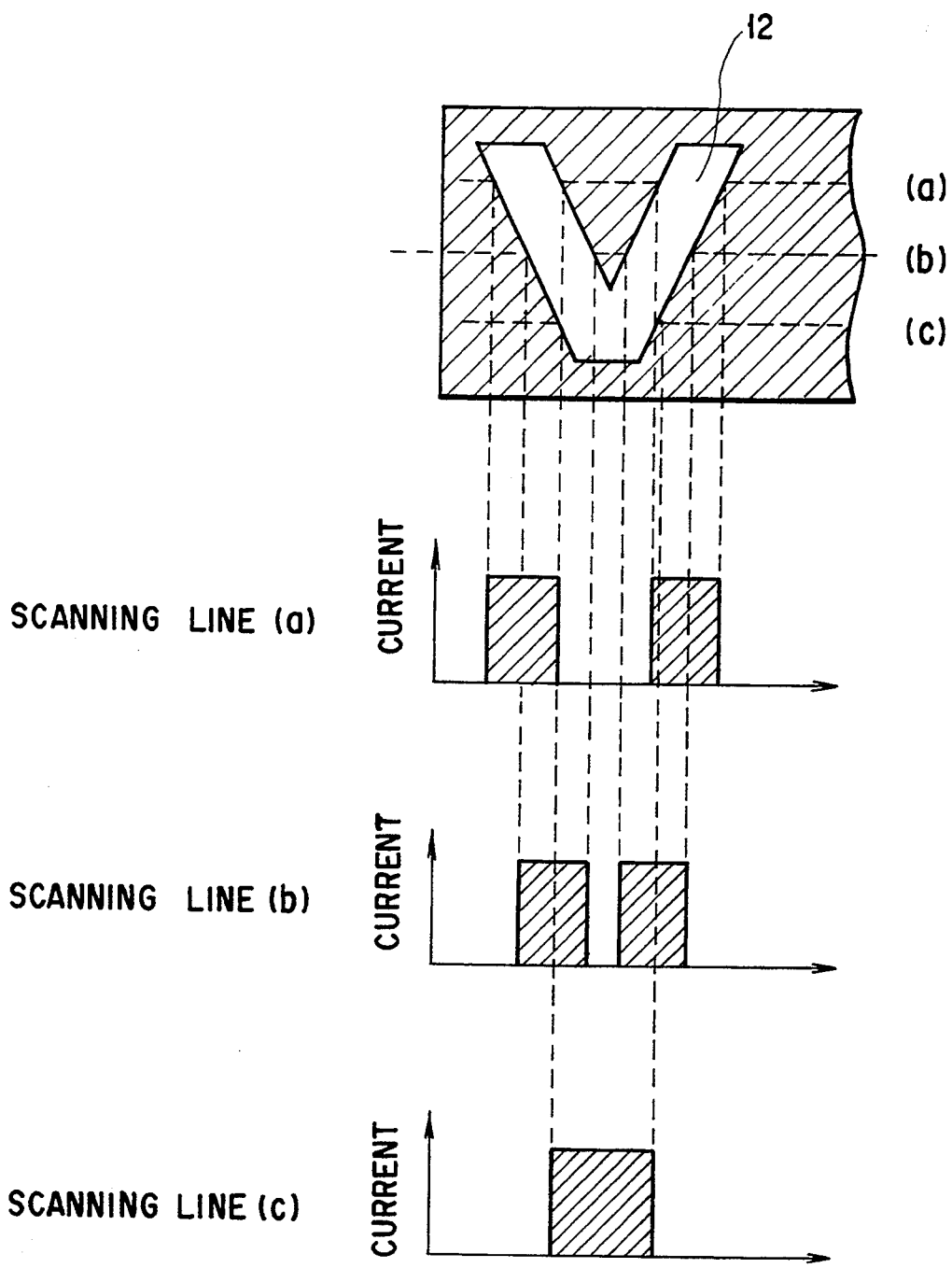
F I G. 29

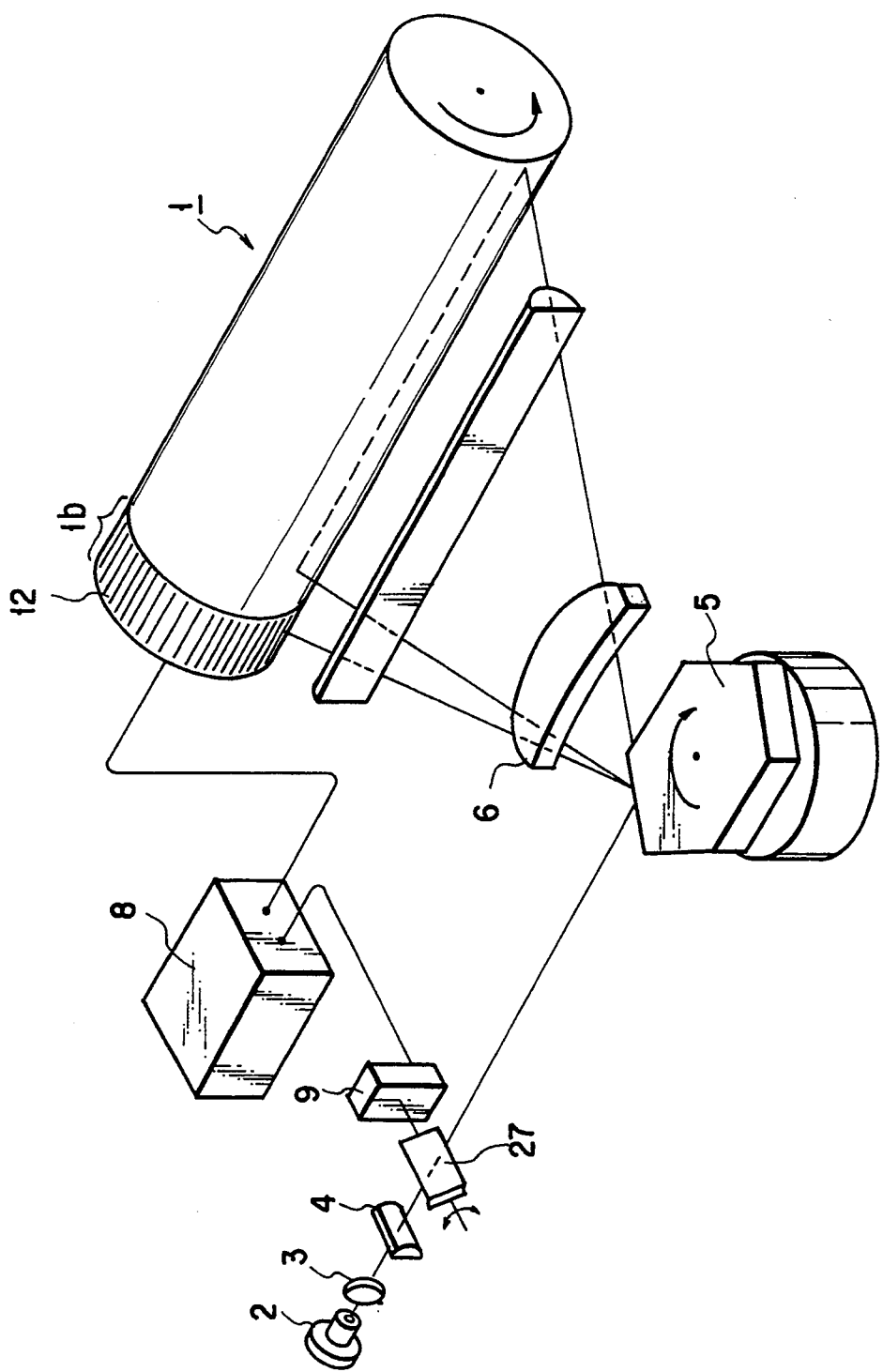
F I G. 37

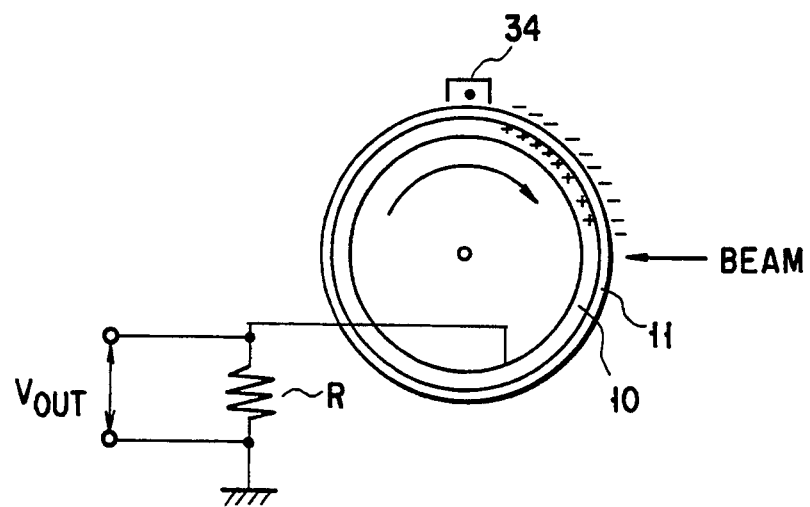
F I G. 38
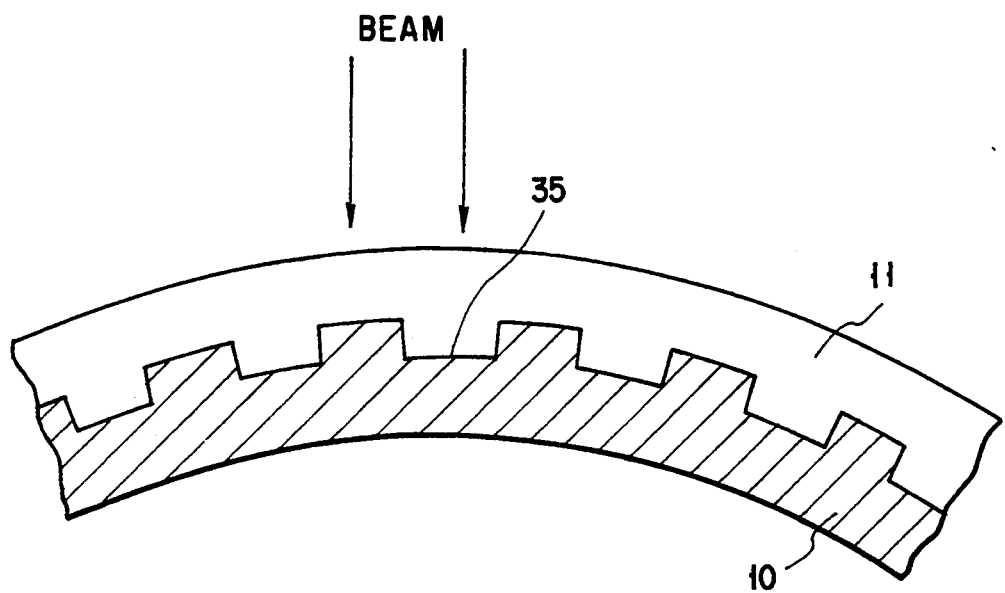
F I G. 39

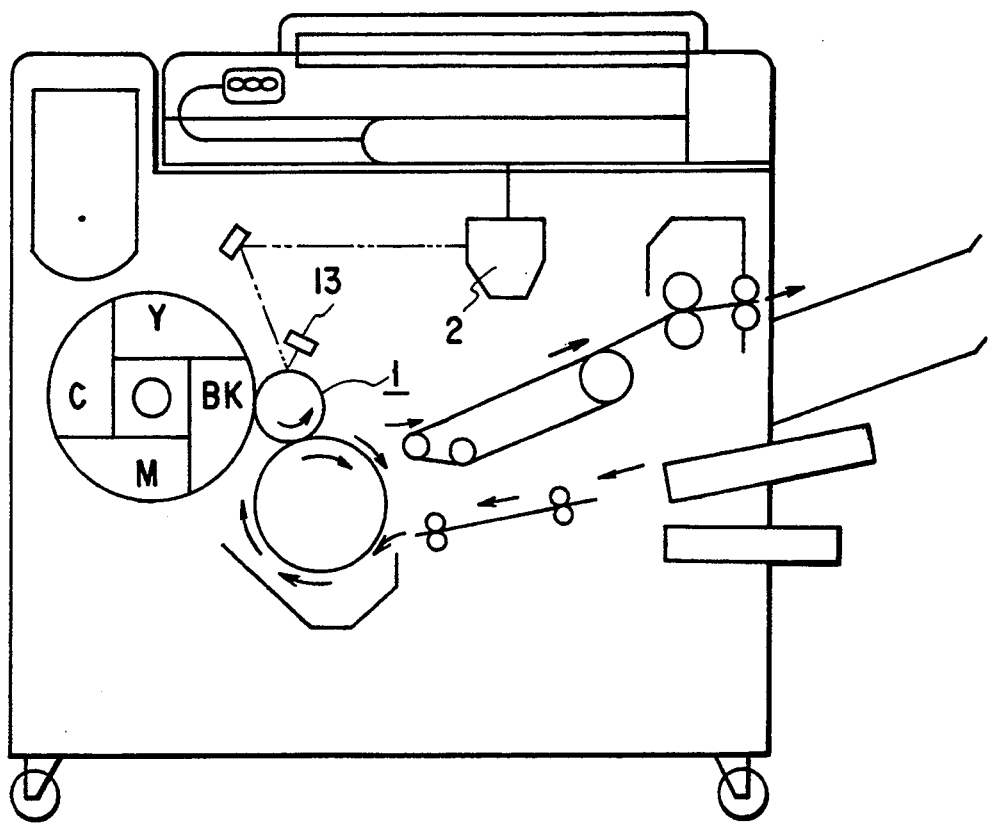
F I G. 41

SCANNING OPTICAL APPARATUS

BACKGROUND OF THE INVENTION

1. Field of the Invention

The present invention relates to a scanning optical apparatus for scanning a beam, which is applied, for example, to a laser printer using a laser beam.

2. Description of the Related Art

A scanning optical apparatus is used in a laser printer, etc. A laser beam is focused in a spot-shape on a photoconductor, and is scanned. In this scanning optical apparatus, if the scanning position of the laser beam is varied, "irregularity in scanning interval" occurs in the direction of movement of the photoconductor, and the quality of an exposed image is degraded owing to "error in optical density" of the image.

In the prior art, in order to prevent the degradation of image, there is provided a correction system, as shown in FIG. 43, as a system for correcting a variation of the scanning position of the laser beam. In this correction system, in order to correct the scanning position of the beam, an error in the scanning position of part of the beam is detected by using a light-receiving unit 7 or the like situated separately from the photoconductor. Based on the error signal from the light-receiving unit 7, a cylindrical lens 4 is displaced, thereby correcting the scanning position. However, in this conventional system, the photoconductor 1 and the light-receiving unit 7 are arranged separately. Thus, a scanning error due to a scanning optical system (i.e. elements 2, 3, 4, 5 and 6) can effectively be corrected; however, since the light-receiving unit is separated from the photoconductor, a scanning error due to a mechanical system (i.e. element 1), e.g. a variation in rotation of the photoconductor 1, cannot be corrected.

According to another correction system (not shown), a plurality of beams are focused at very close points on the photoconductor 1 along the direction of movement of the body 1. Illumination points of the beams are overlapped to form beam spots. By controlling the ratio of light quantity of beams, the spot position is varied. However, it is difficult in the prior art to illuminate a plurality of beams at very close points and focus the beams on the photoconductor without positional displacement.

As stated above, the conventional scanning optical apparatus does not have a correction system for correcting a scanning error due to the mechanical system, e.g. a variation in rotation of the photoconductor. Thus, it has a disadvantage, i.e. the scanning error due to the mechanical system cannot be corrected. In addition, it is difficult to illuminate a plurality of beams at very close points and focus the beams on the photoconductor without positional displacement.

SUMMARY OF THE INVENTION

The present invention has been made in order to overcome the above disadvantages of the prior art, and the object of this invention is to provide a scanning optical apparatus comprising a correction system for detecting a scanning position of a beam irradiated on a photoconductor and correcting scanning errors due to an optical system and/or a mechanical system, whereby the scanning position of the beam can be suitably corrected instantaneously.

In order to achieve the object, there is provided a scanning optical apparatus comprising a beam generating unit for generating a beam; a unit for scanning the beam from the beam generating unit in one direction on a to-be-scanned surface of a photoconductor; a unit for moving the photoconductor in a direction (i.e. a sub scanning direction) substantially perpendicular to the scanning direction (i.e. a main scanning direction); and a correction system for generating a position error signal representing the position error between the scanning position of the beam and a scanning reference position (hereinafter referred to as "mark") on the photoconductor, and suitably controlling the beam scanning position on the basis of the error signal and correcting the position error in real time.

Specifically, in the present invention, the light quantity of the beam reflected or passing-through the to-be-scanned surface of the support body is determined with reference to the mark on the mark section of the support member. Thereby, the scanning position of the beam scanned on the photoconductor is detected. Accordingly, when the beam is scanned at a position deviating from the optimal scanning position, the deviation is detected as a positional error, and the error is photoelectrically converted by a photo element to a corresponding error signal. Based on the error signal, the beam scanning position is optimally corrected.

According to the scanning optical apparatus of the present invention having the above structure, the scanning position of the beam on the photoconductor, thereby correcting the scanning position. Thus, the scanning position error of the beam can be corrected by the single correcting system, whether it is due to the optical system or the mechanical system.

In addition, it is possible to use a scanning optical apparatus adopting a system wherein scanning positions of a plurality of beams are superposed on each other to form a beam spot and the light quantities of the respective beams are controlled thereby to vary the position of the beam spot. In this case, too, the scanning position error can be detected by the single correcting system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows schematically the structure of a first embodiment of the present invention;

FIG. 3 is a cross-sectional view of a driving unit according to an embodiment of an optical system control apparatus;

FIGS. 9A to 9D are timing charts for illustrating the error correction method;

FIG. 12 is a circuit diagram showing an embodiment of a signal processing circuit of a controller;

FIG. 17 shows schematically another structure of the apparatus of the invention, wherein a plurality of light generating devices are provided;

FIG. 18 shows schematically an example of arrangement of the respective parts of the invention;

FIGS. 19A and 19B show extension of beams in the sub scanning direction;

FIG. 25 shows schematically the structure of another embodiment of the invention, wherein a beam is produced by using a plurality of semiconductor lasers;

FIG. 29 illustrates a method of detecting an error by means of marks;

FIG. 37 shows schematically an embodiment of the invention wherein a scale is made of a photosensitive material;

FIG. 38 illustrates the principle of the operation of this embodiment;

FIG. 39 is a partially enlarged cross-sectional view of an example of a cross-sectional pattern formed on an electrically conductive substrate;

FIG. 41 shows the overall structure of a color laser printer to which the scanning optical apparatus of the invention is applied;

DETAILED DESCRIPTION OF THE PREFERRED EMBODIMENT

Embodiment 1

Figure 2:
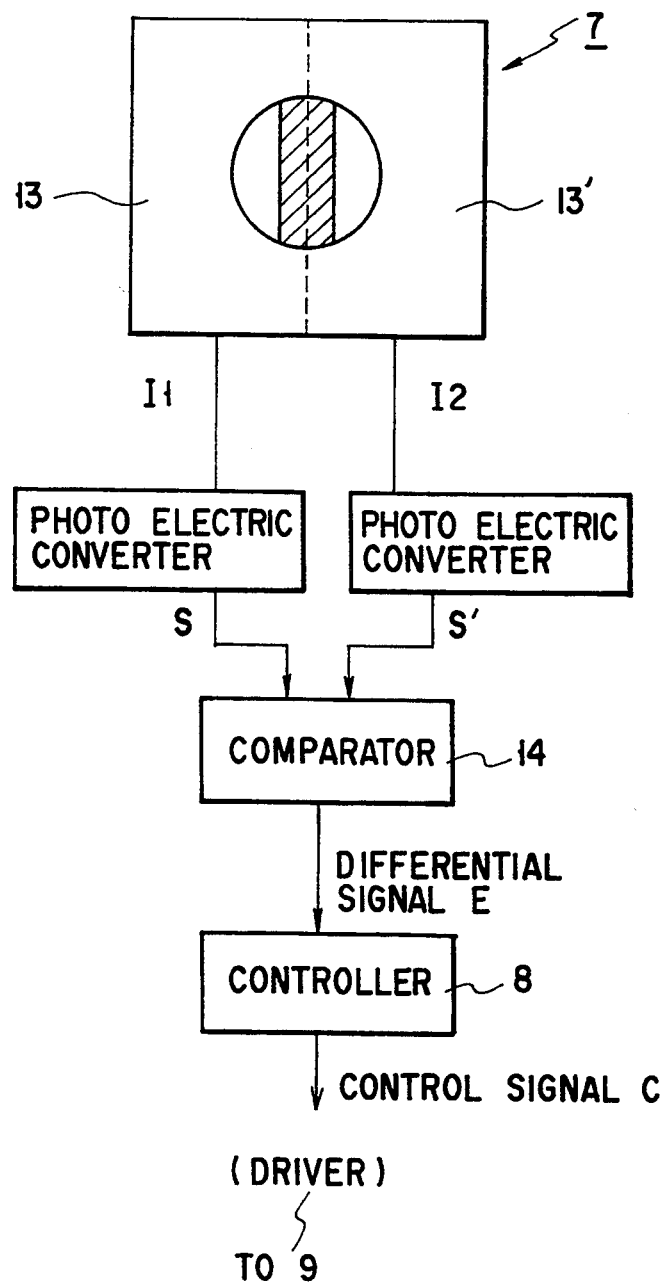
FIG. 2 is a block diagram illustrating the principle of an error signal detection method.

FIG. 1 shows a scanning optical apparatus according to a first embodiment of the present invention. A collimator lens 3, a cylindrical lens 4, a polygonal mirror 5 and an fθ lens 6 are arranged, as shown in FIG. 1, along an optical path of a semiconductor laser 2 for scanning a surface to be scanned (hereinafter, called "to-be-scanned surface") of a photoconductor 1. The scanning optical apparatus further comprises a light-receiving unit 7 situated in such a position as to be able to measure the amount of light on the surface of the photoconductor 1, and a controller 8 and a driver 9 for driving the cylindrical lens 4 on the basis of an electric output signal from the light-receiving unit 7.

A beam emitted from the semiconductor laser 2 is converted to a parallel beam through the collimator lens 3. The parallel beam is converged in a sub scanning direction through the cylindrical lens 4 and is made incident on a reflection surface of the polygonal mirror 5. The polygonal mirror 5 has an optically conjugative positional relationship with the photoconductor 1 in the sub scanning direction. The mirror 5 has a plurality of reflection surfaces and rotates at a fixed speed in the direction of an arrow. The mirror 5 can successively scan a beam incident on the reflection surfaces in a main scanning direction. The beam reflected by the surface of the polygonal mirror 5 passes through the fθ lens 6 and reaches the to-be-scanned surface of the photoconductor 1. The fθ lens 6 has a so-called "fθ characteristic", by which the scanning speed of the beam on the photoconductor 1 is proportional to the rotational speed of the polygonal mirror 5, and also a characteristic by which the beam is focused on the photoconductor 1 in the main scanning direction. Thus, a desired spot size can be obtained on the to-be-scanned surface of the photoconductor 1.

The photoconductor 1 comprises a photosensitive section 1a and a mark section 1b. The photosensitive section 1a is constructed such that a photosensitive layer 11 is provided on the surface of a support member 10. The mark section 1b is formed on at least one end portion of the support member 1 such that marks 12 having a reflection characteristic different from that of the surface of the support member 10 are regularly arranged. It suffices that the marks 12 have a reflection characteristic different from that of the non-mark surface (a surface portion with no mark); thus, marks 12 may be formed on the surface of the photosensitive layer 11, thereby constituting the mark section 1b. As is shown in FIG. 2, for example, the marks 12 on the mark section lb are formed at regular intervals and in stripes, and preferably at intervals equal to the scanning pitch of the beam and in stripes. The mark 12 is a reference mark indicating a scanning reference position of a beam and, for example, a center line of the mark 12 is employed as an optimal scanning position. When the beam scans the marks section 1b, part of the beam is reflected as a result of the presence/absence of marks 12 and is made incident on the light-receiving unit 7.

The light-receiving unit 7 has two light-receiving surfaces. Photo detective elements 13 and 13' are provided on the respective light-receiving surfaces. The photo detective elements 13 and 13' output electric output signals S (I1) and S'(I2) in accordance with the amounts of incident light.

The controller 8 outputs a control signal C for driving the cylindrical lens 4 on the basis of the output signals S and S' delivered from the light-receiving unit 7. A difference between the output signals S and S' from the photo detective elements 13 and 13' is obtained by a comparator 14, as shown in FIG. 2. The difference is output as a scanning position error signal (hereinafter referred to as "error signal E"). Specifically, if the received light quantities of the photo detective elements 13 and 13' are equal, the magnitudes of output signals S and S' are equal (S =S') and the error signal E is zero (=S−S'). If the received light quantities differ, the magnitudes of output signals S and S' differ accordingly and the error signal E is measured. Based on the measured error signal E, the control signal C for driving the cylindrical lens 4 is output to the driver 9.

The driver 9 is constituted, as shown in, e.g. FIG. 3, such that a cylindrical magnetic body 16 such as a permanent magnet is fixed on a support base 15. A coil 17 is slidably inserted in the magnetic body 16. The cylindrical lens 4 is coupled to the coil 17 as one body. The cylindrical lens 4 is slid vertically by a predetermined amount in accordance with the magnitude of induced electromotive force created by the coil 17.

The controller 8 and driver 9 drive a mirror, a prism, etc. situated along an optical path and varies the scanning position of the beam. In addition, using an acoustic optical modulator (AOM), the optical axis of the beam may be varied.

Next, the correction system for correcting the beam scanning position by using the scanning optical apparatus of the present embodiment will now be described.

A beam scans the to-be-scanned surface of the photoconductor 1 in the main scanning direction from the scan start position on the mark section (1b) side. When the beam scans the marks 12 of the mark section 1b, part of the beam is reflected from the marks 12 of the mark section 1b and is made incident on the light-receiving unit 7. When the scanning position of the beam is displaced from the optimal scanning position on the photoconductor 1, the amounts of light reflected from the photoconductor 1 and made incident on the photo detective elements 13 and 13' of the light-receiving unit 7 differ from each other and accordingly a departure from the optimal scanning position can be measured as an error on the basis of the difference between output signals generated from the photo detective elements 13 and 13'. That is, on the basis of the magnitude of the value of the error signal E, the degree of departure from the optimal position can be measured. In addition, on the basis of the sign of the error signal E, the direction of departure of the beam can be detected.

Subsequently, the control signal C based on the error signal E is amplified to a desired level and is thereafter delivered to the coil 17. Thereby, the cylindrical lens 4 coupled integrally to the coil 17 is vertically slid and is locked at the optimal position. After the beam has scanned one line portion of the photosensitive section of photoconductor 1, the beam scans the next line portion similarly.

According to the present embodiment, marks 12 serving as reference scanning marks are formed in advance on the mark section lb of photoconductor 1. By receiving reflection from the marks, the error of the beam is constantly measured and correction of beam scanning position is performed. Therefore, exact beam scanning can be performed without non-uniformity of the scanning pitch.

In addition, irrespective of whether the error of the beam scanning position is due to the optical path of the beam (i.e. an optical cause) or the variation in rotation of the photoconductor 1 (i.e. a mechanical cause), a scanning position error signal obtained from the marks on the photoconductor is detected and corrected. Thus, exact beam scanning can always be performed.

Figure 4A:
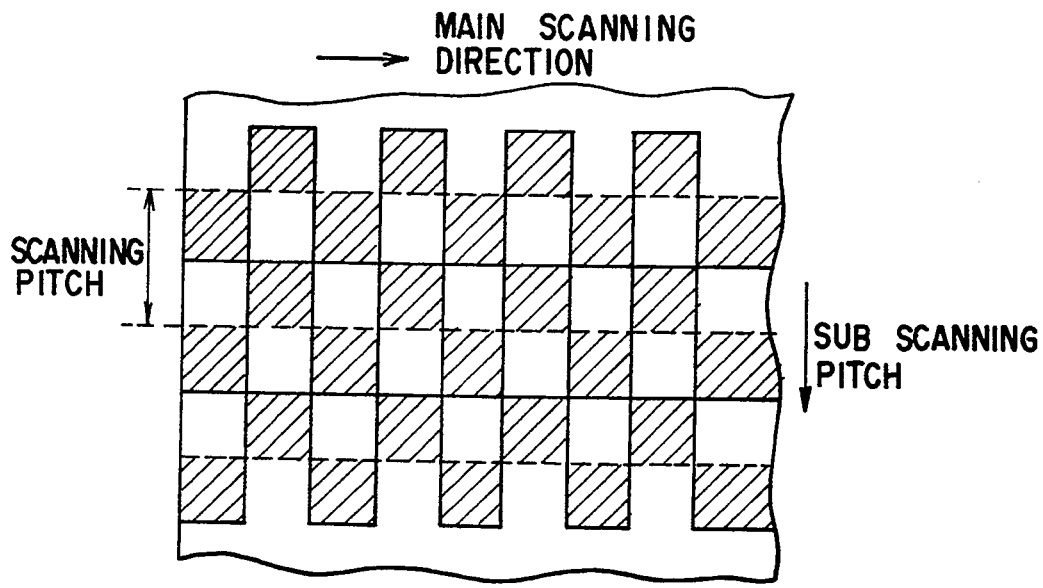
FIG. 4A is a plan view showing an embodiment of the surface of a photoconductor, on which lattice-shaped marks are situated.
Figures 4B, 4C:
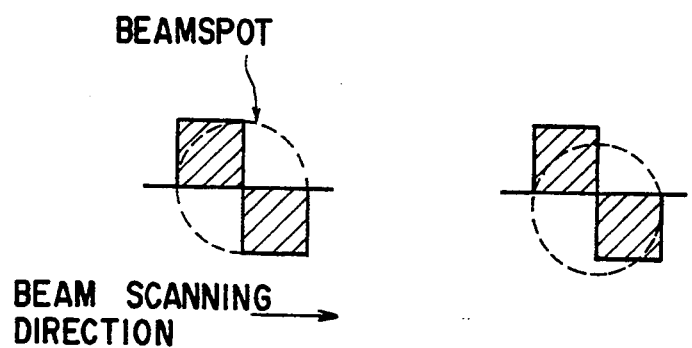
FIGS. 4B and 4C are partially enlarged views showing beam spots on the marks.
Figures 4D, 4E:
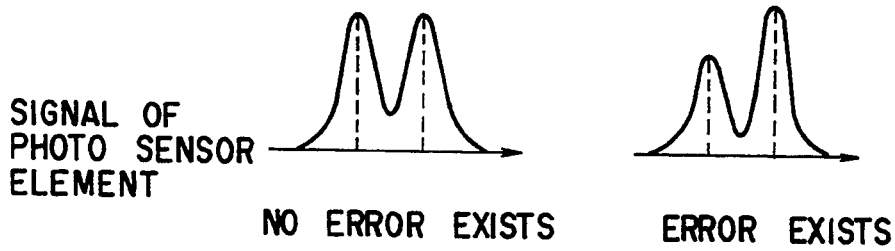
FIGS. 4D and 4E are graphs showing waveforms of signals generated by illumination of beams.

The marks may have various shapes. For example, the marks 12 may have a diced pattern, as shown in FIG. 4A, instead of a striped pattern. In other words, in FIG. 2 illustrating the method of detecting the scanning position error by means of photo detective elements 13 and 13', the same effect as with the striped marks can be obtained with the diced-pattern lines as reference marks of optimal beam scanning position.

In the mark section lb of this embodiment, it suffices that the reflectance of the marks differs from that of the other area. Accordingly, the marks can easily be formed by attaching a printed sheet having a desired pattern, or by forming holes in the surface of the photoconductor by means of a thick-film printing technology or a cutting process. However, since the photosensitive section la itself of the photoconductor 1 has low heat resistance; therefore, the following process of forming marks is desirable.

Specifically, the photosensitive section la having the photosensitive layer 11 is formed separately from the mark section 1b having the marks 12. Then, these sections 1a and 1b are coupled as one body. More specifically, a heat-contractible sheet on which a desired pattern is printed in advance is wound on the surface of the support member 10, the sheet is heat and put in close contact with the support member 10. Thereafter, the support member 10 is coupled to the photosensitive section 1a as one body. Alternatively, a photosensitive material is coated on the support member 10, marks are written by an exposure device, the marks are made visible by development, and then the support member 10 is coupled to the photosensitive section 1a as one body.

As stated above, the photosensitive section 1a and mark section 1b of the photoconductor 1 are formed independently. Thus, it is not necessary to take the thermal characteristics of the photosensitive layer 11 into account. In addition, since only the photosensitive section 1a needs to be exchanged when replacing the photoconductor 1, the cost can be reduced to a minimum.

Embodiment 2

Figure 5:
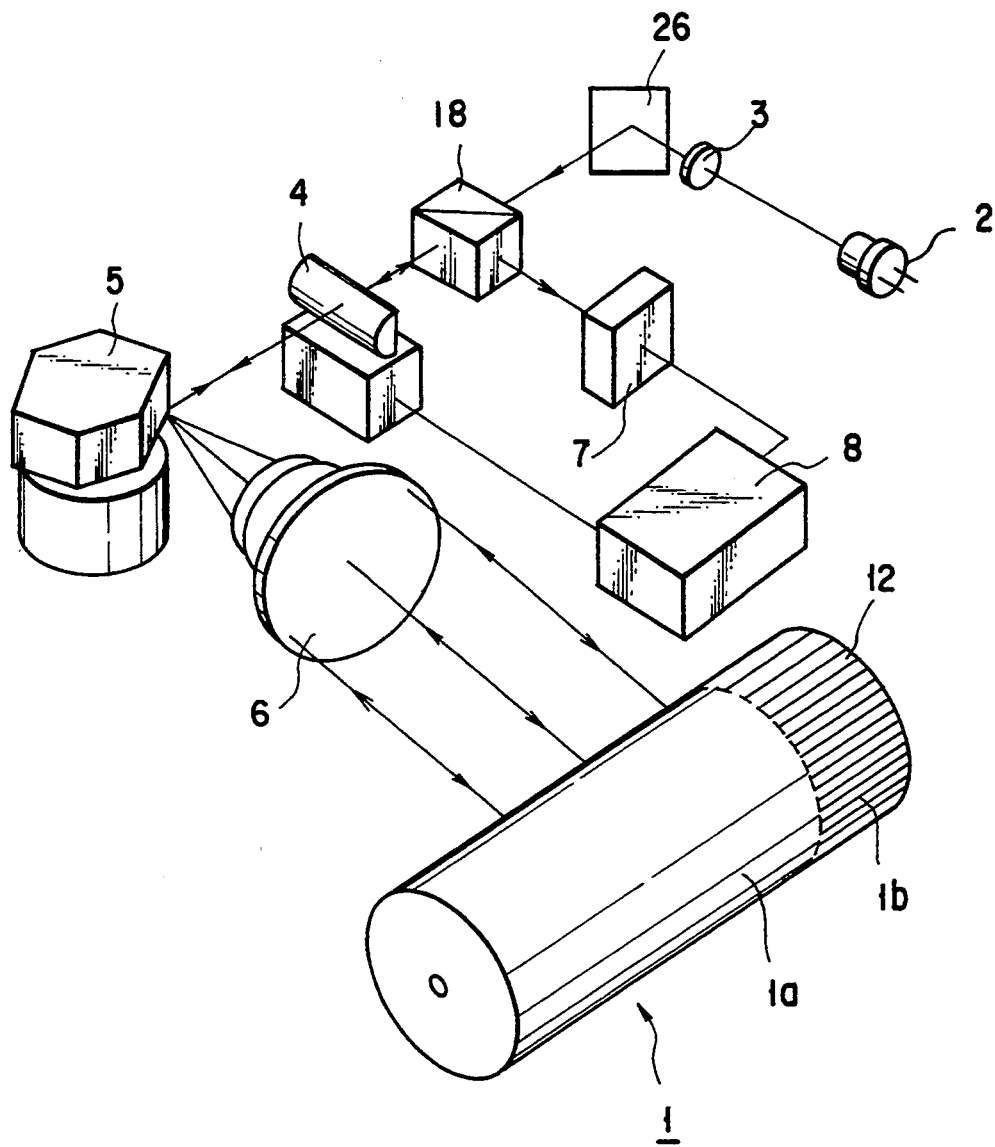
FIG. 5 shows schematically the structure of a second embodiment of the invention.

FIG. 5 shows schematically a scanning optical apparatus according to a second embodiment of the invention. In this embodiment, a beam emitted from a semiconductor laser 2 is converted to a parallel beam through a collimator lens 3. The parallel beam passes through a beam splitter 18 and is converged by a cylindrical lens 4 in a sub scanning direction and focused on a reflection surface of a polygonal mirror 5. An $f\theta$ lens 6 is situated midway along the optical path of the beam reflected by the polygonal mirror 5. The beam travels through the $f\theta$ lens 6 and is made incident substantially vertically on a photoconductor 1 or a surface to be scanned. Part of the beam is reflected. The beam is illuminated on the to-be-scanned surface of the photoconductor 1 substantially vertically; thus, the reflected beam is returned to the beam splitter 18 through the same path. The beam incident on the beam splitter 18 does not return to the semiconductor laser 2, but enters a light-receiving unit 7. Thus, an error signal E is detected.

In this embodiment, the scanning optical system for illuminating the beam on the photoconductor 1 is also used as a correction optical system; thus, a separate optical system for correction is not required, and the structure of the apparatus is simplified.

In this embodiment, the beam splitter 18 is situated between the semiconductor laser 2 and the cylindrical lens 4, thereby detecting the error signal; however, the beam splitter 18 may be situated anywhere if it can receive reflection light from the photoconductor 1.

Embodiment 3

Figure 6:
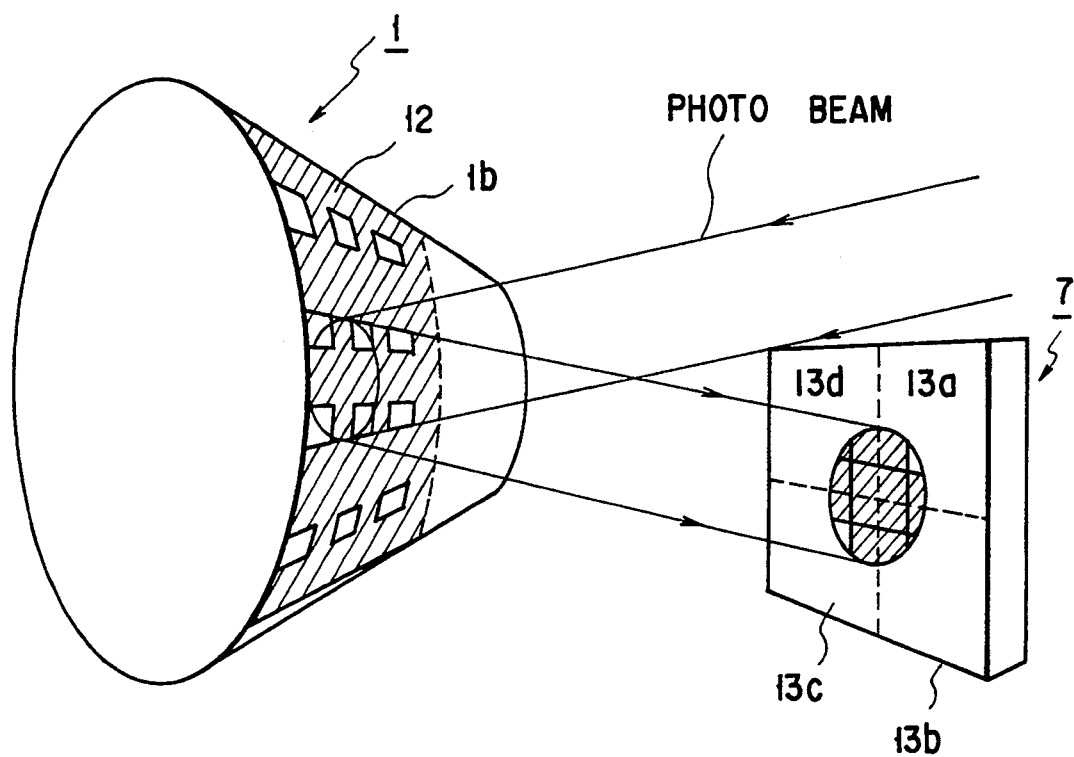
FIG. 6 illustrates the principle of error correction when the lattice-shaped marks are used.

FIG. 6 shows an important portion of the scanning position correction system of a scanning optical apparatus wherein lattice-shaped marks 12 are provided on the surface of the photoconductor 1. A method of correcting the beam scanning position by using the photoconductor 1 shown in this embodiment will now be described. The scanning optical system may have the same structure as that shown in FIG. 1. However, the photo detective elements constituting the light-receiving unit 7 are photo detective elements 13a, 13b, 13c and 13d. Now suppose that a beam is incident on these photo detective elements from the photoconductor. If the beam is scanned at an area departing from the optimal position, the received light quantities in the respective photo detective elements are different. Consequently, signal currents containing error signals are generated in electronic elements (see FIG. 7) connected to the respective light-receiving surfaces.

Figure 7:
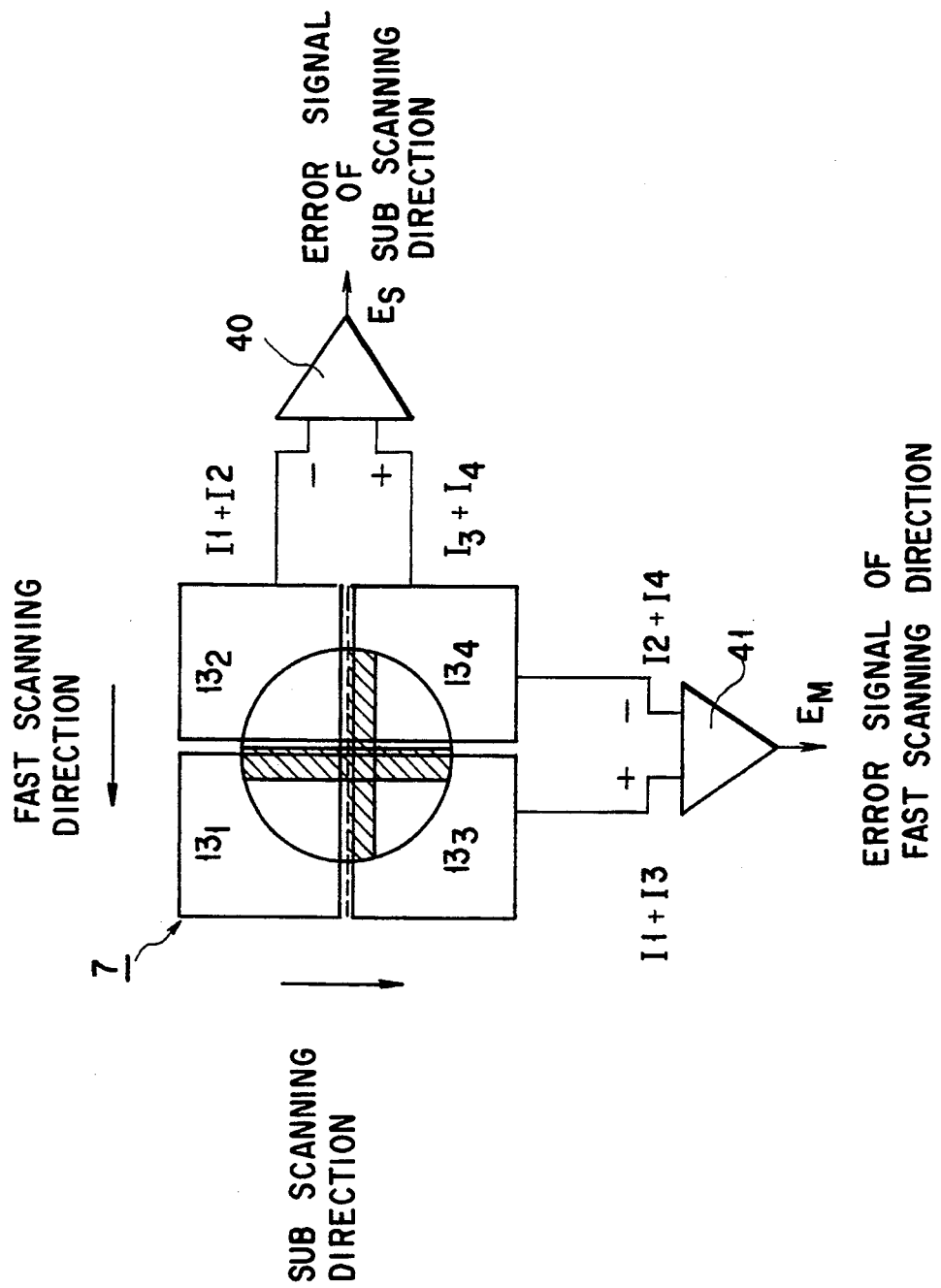
FIG. 7 illustrates the principle of error signal detection by means of a light-receiving unit consisting of four parts.

FIG. 7 illustrates the state wherein a reflected beam is made incident on four photo detective elements $13_1$ to $13_4$ constituting the light-receiving unit 7, and the principle of detecting an error signal. When the beam is scanned on the optimal scanning position, the amounts of reflection light received by the four photo detective elements from the photoconductor are equal. At this time, the photo detective elements $13_1$ to $13_4$ generate output signals of equal magnitudes to electronic elements 40 and 41. A difference between these output signals is zero, and it is found that the beam is scanned on the optimal position. When the beam is scanned on a point departing from the optimal position, the reflection beam from the surface of the photoconductor 1 is made incident on the photo detective elements $13_1$ to $13_4$ in accordance with the degree of departure from the optimal position. The respective photo detective elements generate output signal currents of incident light on the basis of the departure from the optimal position. The difference between the output signals is proportional to the departure from the optimal position. An error signal EM represents the value of the error in the main scanning direction, and an error signal ES the value of the error in the sub scanning direction. Based on the error signals EM and ES, the controller 8 (not shown) varies the scanning position of the beam in real time. Thus, the scanning position of the beam on the photoconductor body 1 can be corrected.

According to this embodiment, the directions of the errors of the scanning positions (in the main scanning direction and sub scanning direction) and the magnitudes of the errors can be detected on the basis of the differences between the output signals generated by the four photo detective elements of the light-receiving unit. Thus, the beam scanning position can be corrected in real time. In addition, the variation in position in the main scanning direction can be detected by forming, e.g. "continuous pattern" marks. Thus, not only the error in the sub scanning direction due to a variation in rotation of the photoconductor 1 but also the error in the main scanning direction (or the scanning direction of the optical system) can be corrected. That is, the errors in a two-dimensional plane can be corrected.

Embodiment 4

Figure 8:
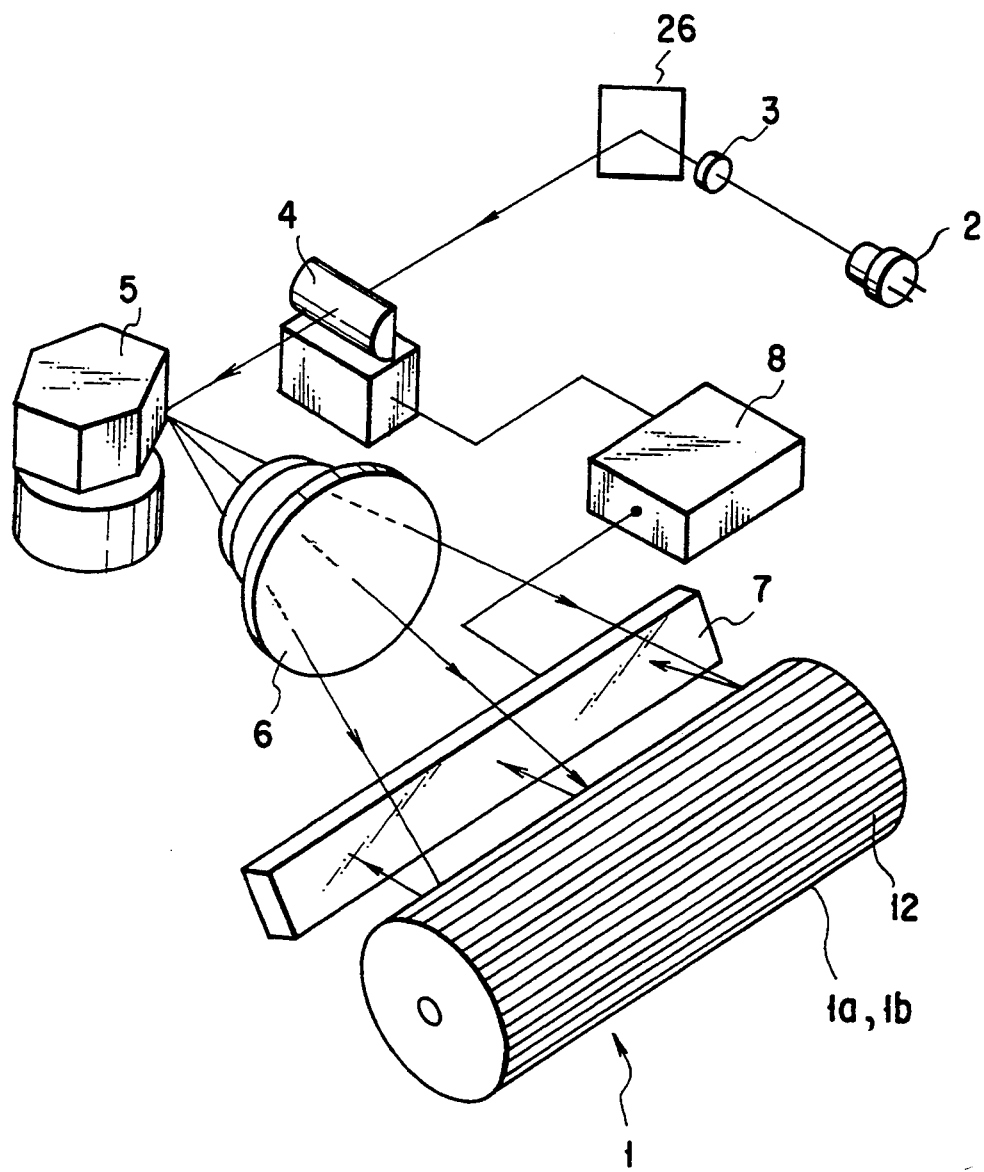
FIG. 8 shows schematically the structure of another embodiment of the invention.

FIG. 8 shows a fourth embodiment of the scanning optical apparatus for correcting an error of a beam scanning position on a recording surface region of a photoconductor 1. In the first embodiment, a beam scanning position on the photoconductor 1 is corrected at the beginning of a scanning line before scanning an image information scanning region; by contrast, in the fourth embodiment, the scanning position is corrected while a beam is scanning the information recording region on the photoconductor. In this case, it is necessary to continuously illuminate the beam on those points of the photosensitive, where image information is not recorded (hereinafter referred to as "non-recording points"). Accordingly, by reducing the intensity of the beam at the non-recording points to such a level that the beam is not recorded on the photoconductor 1, the beam scanning position on the photoconductor 1 can be detected without disturbing the image information.

In addition, a photosensitive material having a non-linear sensitivity to the light quantity of the beam may be used. In this case, the intensity of the beam is increased at those points where image information is recorded (hereinafter referred to as "recording points", and the intensity of the beam is decreased at the non-recording points. By scanning the beam over the entire information recording region on the photoconductor 1, the error of scanning position can be detected and corrected.

FIGS. 9A to 9D are timing charts relating to the error correction method. FIG. 9A shows a standard clock indicating the time period during which image points are recorded on the photoconductor 1. A recording signal is generated in synchronism with the standard clock (see FIG. 9B). The beam strength is varied in accordance with the recording signal (see FIG. 9C). Thereby, the beam can be scanned over the non-recording points, and the beam scanning position error can be detected. In this case, however, since the intensity of the reflection light from the photoconductor 1 is varied owning to the variation in beam strength, it is necessary to correct the light intensity of a weaker portion of the error signal generated from the photo detective element 13. This correction is illustrated in FIG. 9D. Actually, the error signal is corrected in a signal processing circuit in the controller 8, to which the error signal and recording signal are input. Thus, the beam scanning position can be corrected without recording image at the non-recording points on the photoconductor 1. As has been stated above, where the photosensitive material having a non-linear sensitivity to the light quantity is used, image points free from error in optical density can be formed by using a beam having a strength enough to form image points at the recording points, even if the light intensity is weakened by the presence/absence of the beam scanning position reference marks.

In the case of using the photosensitive material having a non-linear sensitivity to the light quantity of the beam, if the beam irradiate time is decreased to limit the amount of incident light to the photoconductor 1, an adequate latent image contrast on the photoconductor 1 cannot be obtained and the formation of image points on the photoconductor 1 can be suppressed. Utilizing this property, the beam scanning position error can be corrected during the time period from when the beam is illuminated at a certain image point to when the image point is formed on the photoconductor 1. Thus, the beam position error on the recording region can be corrected without disturbing image information.

If the marks on the recording surface of the photoconductor are formed of an electrically conductive material, toner can be adhered in the printing process with no problem.

Figure 10A:
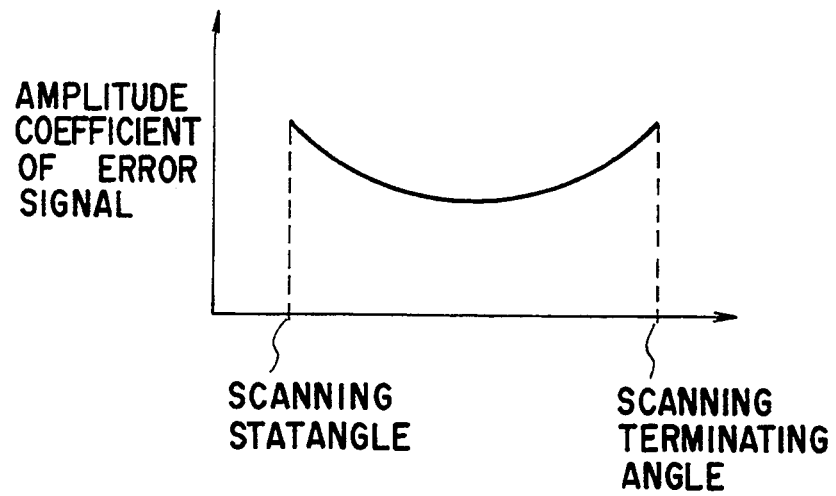
FIG. 10A illustrates the principle of a method of amplifying an error signal.
Figure 10B:
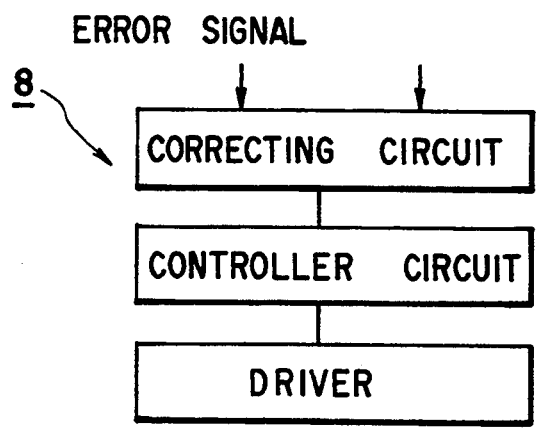
FIG. 10B illustrates the flow of signals at the respective parts of the control apparatus.

The light incidence angles at a center portion and an end portion of the photoconductor 1 are different from each another. At the end portion of the body 1, the beam is weak. The strength of incident light differ between portions of the photoconductor 1. Thus, the strength of the reflection light incident on the photo detective element differs, depending on the position on the photoconductor, and the magnitude of the error signal varies, depending on the position of the photoconductor. FIG. 8 shows means for compensating a variation in strength of the beam scanned on the photoconductor. For example, this means amplifies the beam irradiate strength in accordance with the scanning position on the photoconductor. FIG. 10A is a graph illustrating the principle of a method of amplifying an error signal, i.e. the relationship between the amplification coefficient of error signal and the deflection angle of the polygonal mirror. FIG. 10B is a flowchart illustrating the flow of signals at the respective functional blocks of the controller 8. In FIG. 10A, at the beam scanning start angle and beam scanning terminating angle, the light strength is low and the reflection light from the photoconductor 1 is weak. The beam strength can be made uniform by increasing the amplification coefficient of the error signal gradually towards these two angles. Accordingly, if the beam strength corresponding to the rotational angle of the polygonal mirror 5 is calculated in advance in a correcting circuit in FIG. 10B, a controller circuit enables a driver to correct the error signal E generated by the photo detective element 13, on the basis of the value obtained by multiplication with the amplification coefficient.

As a modification of this embodiment, means may be provided for varying the light reception sensitivity of the photo detective element 13 in accordance with the scanning position on the photoconductor 1. In addition, in order to optically correct the error, a lens may be inserted to make the beam incident vertically on the entire scanning region of the photoconductor 1, thereby constituting the correcting system.

Embodiment 5

Figure 11A:
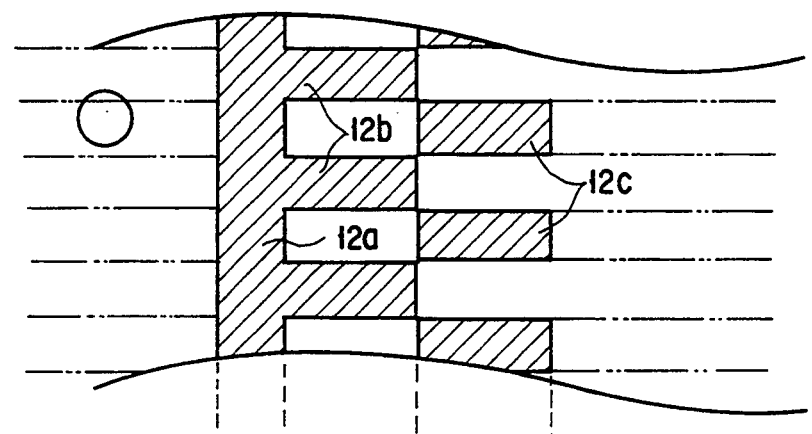
FIG. 11A is a schematic diagram showing an example of a mark pattern.

FIG. 11A shows an example of a pattern of marks 12 provided on the mark section 1b of the photoconductor 1. A mark 12a has a reflection characteristic different from that of the surface of the mark section 1b. The mark 12a is formed in a strip with no breakage from the scanning start position on the surface of the mark section 1b of the photoconductor 1 along the entire circumference of the photoconductor 1 in the direction of movement. Marks 12b, like mark 12a, have a peculiar reflection characteristic. The marks 12b are regularly arranged in contact with the edge of the mark 12a at intervals equivalent to double the beam scanning pitch. Marks 12c are arranged at the same intervals as the marks 12b in a staggered manner such that the marks 12c and marks 12b appear alternately in the main scanning direction. The horizontal boundaries (two-dot-and-dash lines in FIG. 11A) of the marks 12b and 12c are defined as optical beam scanning positions.

Figure 11B:
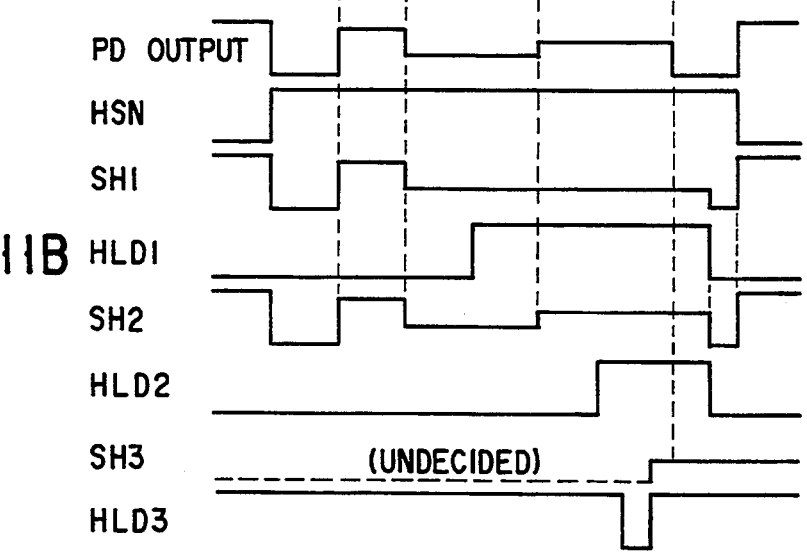
FIG. 11B is a timing chart of output signals corresponding to the mark pattern.

Each timing chart of FIG. 11B illustrates the operation of the signal processing circuit of the controller shown in FIG. 12. Based on the timing charts, the operation of the signal processing circuit will now be described.

The photo detective element 13 generates an output signal when a beam continuously scans an effective light-receiving region specified by a horizontal synchronous signal (HSN signal) in the main scanning direction. Specifically, the output signal generated when the light-receiving region formed by the mark 12a is scanned is employed to obtain a synchronous signal for holding a signal input to a sample/hold IC 19 and a sync signal for a write start position of each scanning line. The input signal is delivered to a controller 20 via a schmidt trigger 23. An output signal generated when the light-receiving region formed by the marks 12b is supplied to the sample/hold IC 19a and 19b via an amplifier 21a. The controller 20 holds only the sample/hold IC 19a by a hold signal HLD1 before the light-receiving region formed by the marks 12c is scanned on the basis of the sync signals. Subsequently, the beam scans the light-receiving region formed by the marks 12c, and the sample/hold IC 19b is held by a hold signal HLD2 on the basis of the sync signals. After the sample/hold IC 19a and 19b are held, signal formation is performed by a differential amplifier 22. The wave-shaped signal is held by a sample/hold IC 19c and then output as a control signal via an amplifier 21b. The output signal is held by the sample/hold IC 19c in order to prevent erroneous driving before the control signal is determined.

Figure 13A:
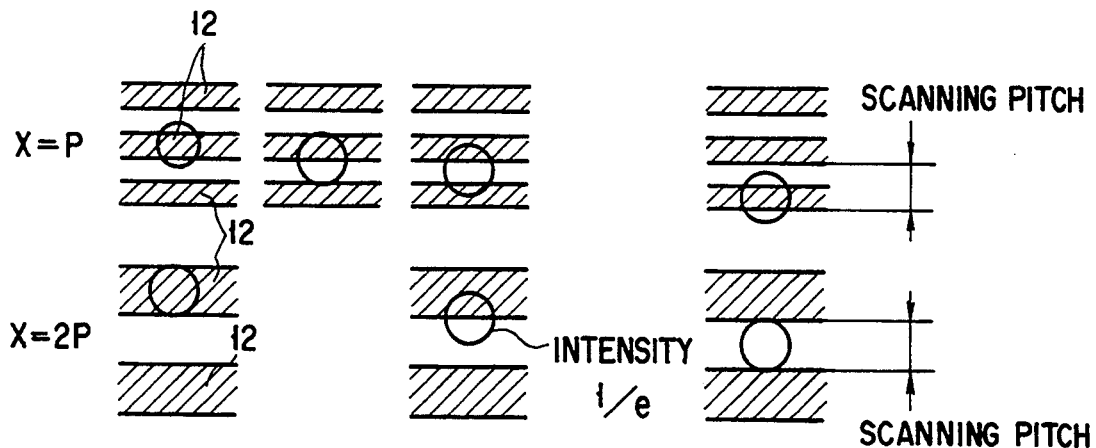
FIG. 13A shows scanning positions of beams at the time when Gaussian beams are illuminated.
Figure 13B:
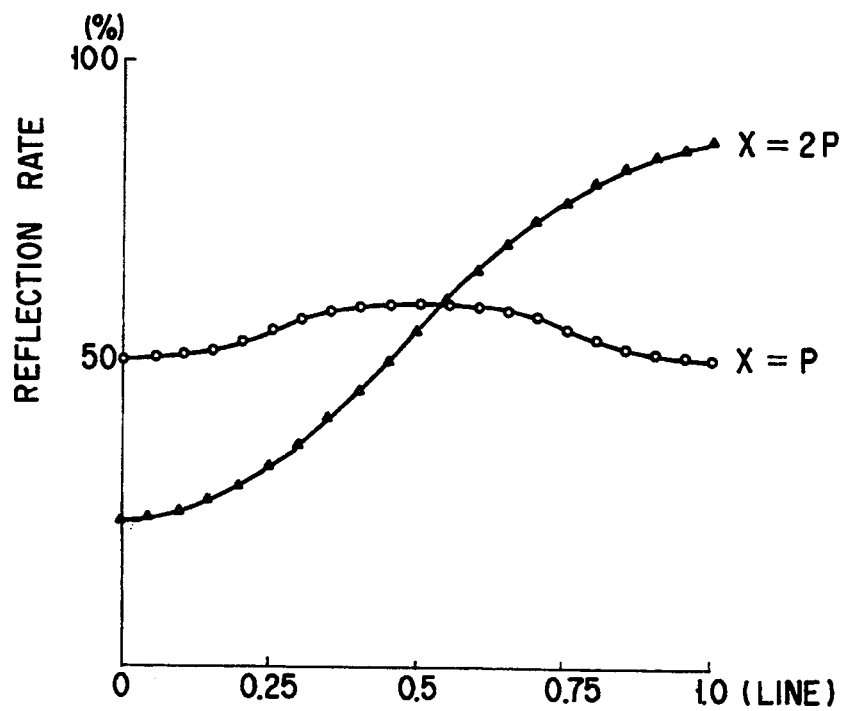
FIG. 13B is a graph showing variations of reflection light quantities at that time.

The advantage of this embodiment obtained by setting the mark repetition cycle at double the scanning pitch will now be stated. FIG. 13A illustrates the relationships of X=P and X=2P (X=the mark repetition cycle; P=the scanning pitch), and FIG. 13B (graph) shows the relationship between the beam scanning position and the reflection light quantity when Gaussian beams, which have a strength of 1/e at a picture element diameter P from the center, are illuminated on the marks. The ratio of the portion of the mark with high reflectance to the portion with low reflectance is 1:1. It is understood from FIG. 13A that when X=P the variation in reflection light quantity is low, and the beam position can be detected only in a range between 0 and 0.5 (with 0.25 as center value) of the value of Xb (distance from the mark center). By contrast, where X=2P, the variation in reflection light quantity is large, and the beam position can be detected in a range between 0 and 1.0 (with 0.5 as center value) of the value of Xb. As seen from this, the performance of beam scanning position detection is remarkably enhanced by setting the mark repetition cycle at double the scanning pitch. It was also confirmed that the detection performance was further enhanced when the mark repetition cycle X=3P or more. In this case, however, the control system becomes complex, and from the practical viewpoint X=2P is optimal.

The present embodiment can be applied to a multibeam printer wherein recording is effected simultaneously on a plurality of scanning lines by using a plurality of beams. If the pitch of beams (scanning pitch X number of beams) is combined with the cycle of marks, error signals are output similarly in any scan. Thus, it is not necessary to switch, in every scan, the signal processing means for obtaining the control signal from the error signal, and the signal processing circuit is simplified.

Embodiment 6

Figure 14:
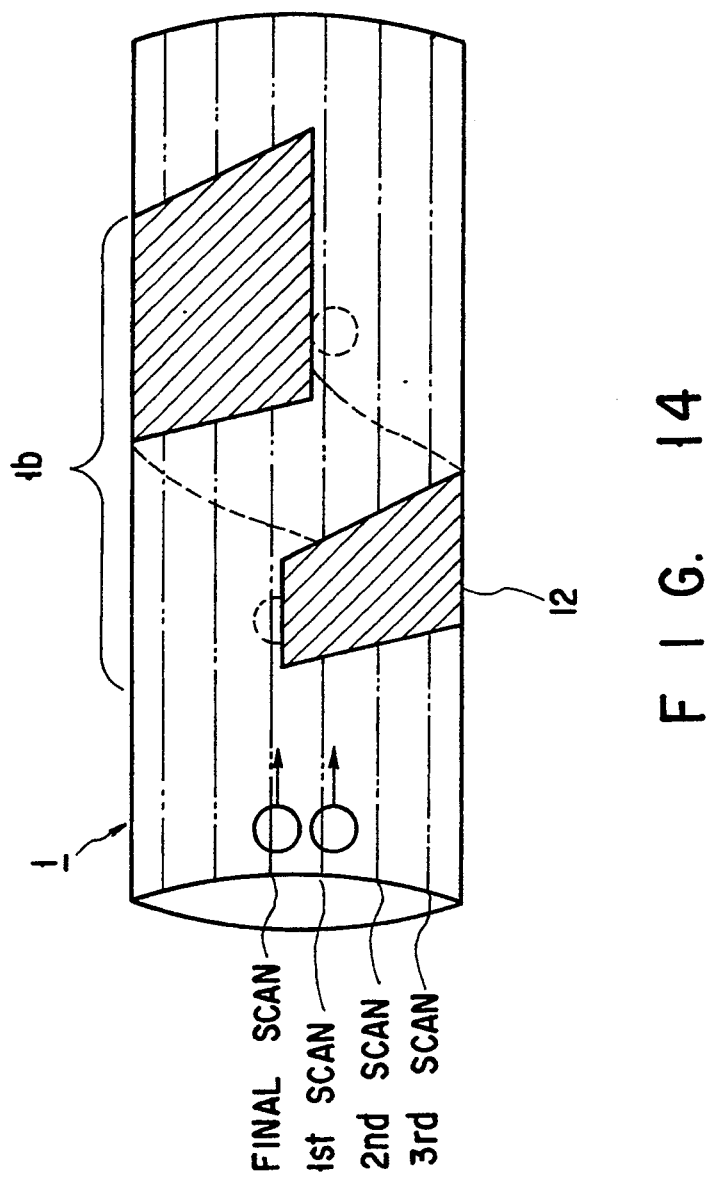
FIG. 14 shows schematically an example of a pattern of marks arranged on the peripheral surface of a photoconductor.

FIG. 14 shows an example of the shape of the mark 12 of the mark section 1b formed on the surface of the cylindrical photoconductor 1. In this embodiment, the mark 12 has a strip-like pattern and is wound around the photoconductor 1 without breakage. The width of the mark 12 in the main scanning direction varies at a fixed rate slantingly along the sub scanning direction of the photoconductor. The start end and terminating end of the mark 12 are slightly overlapped with each other in the sub scanning direction. This is a technique for increasing margins of the start and terminating ends of one mark, in order to cancel the scanning position error during scanning.

Figure 15:
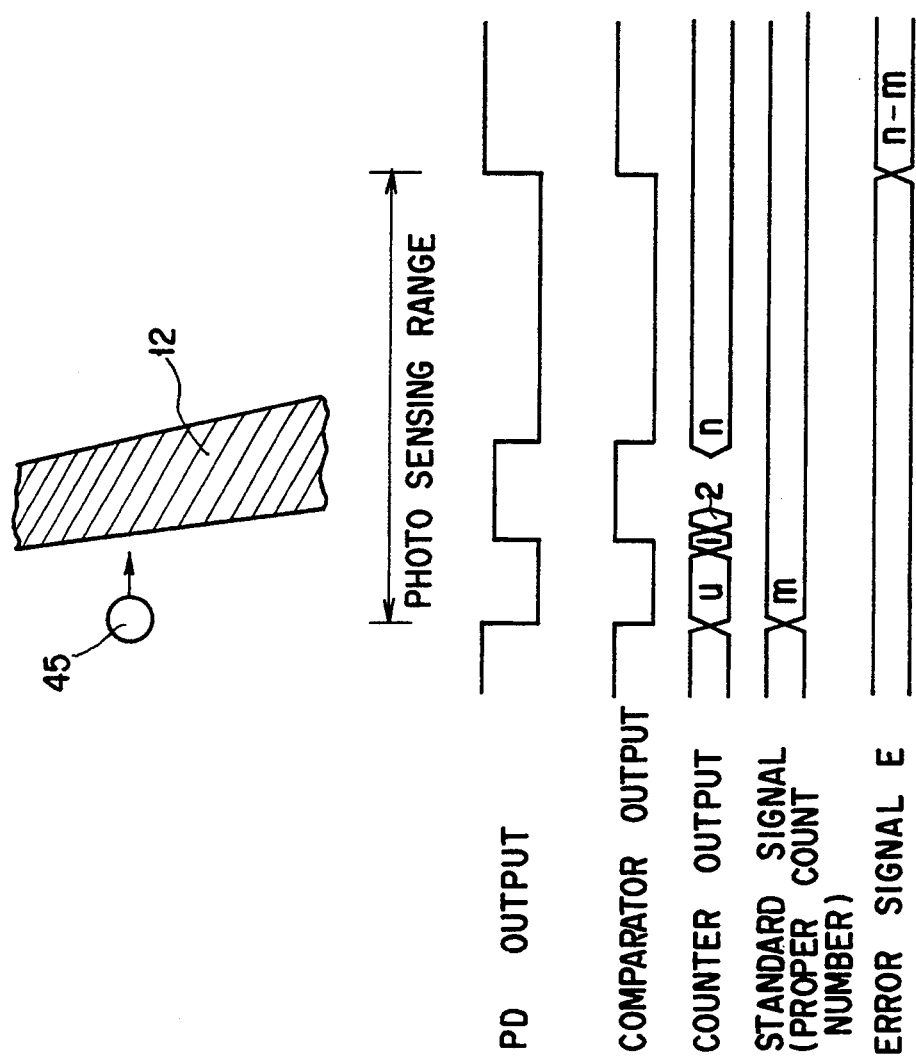
FIG. 15 shows schematically another example of the mark pattern.

When the mark 12 shown in FIG. 15A is scanned by a beam spot 45, pulses with different lengths are obtained in accordance with the scanning position on the mark. Accordingly, control signals (output signals) corresponding to the pulse widths can be obtained, as shown in FIG. 15B.

Figure 16:
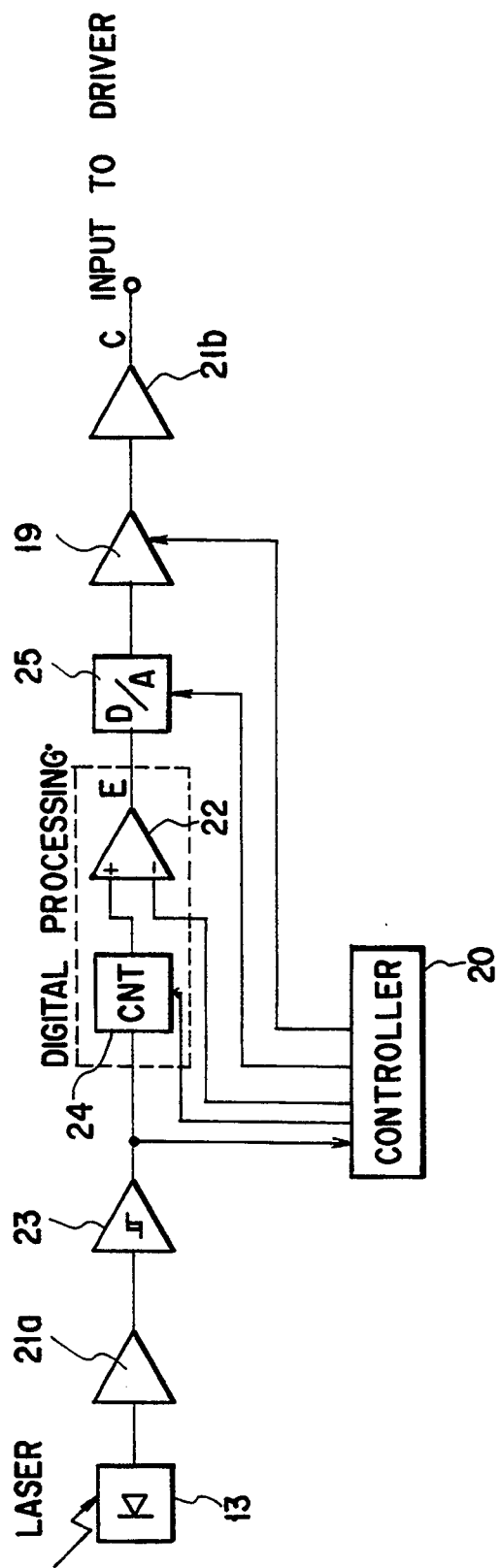
FIG. 16 shows an error signal detection circuit for detecting error signals during beam scanning.

FIG. 16 shows another embodiment of the signal processing circuit of the controller for detecting error signals. An output from the photo detective element 13 is suitably amplified by an amplifier 21a. The amplified signal is converted to a digital pulse by an analog converter 23 with a schmidt trigger. The time during which pulses are output is counted by a counter 24. A difference between the count value of the counter 24 and a predetermined count value at an optimal position is computed by digital processing, thus producing an error signal. Since the count value at the optimal position varies in every scan, it is read out from the controller 20 in every scanning operation. Then, the obtained error signal is converted to an analog signal by a D/A converter 25. The analog signal is held by a hold signal.

When the signal processing circuit of the controller is constructed by analog system, the output pulses are integrated by an integrator such as an operational amplifier, instead of using the counter, and the difference between the integrated value and a reference signal is calculated by a subtracter.

The error signal E is suitably amplified to obtain a control signal C, and the control signal C is input to the controller 8. Thus, the beam position is corrected.

The repetition cycle of the marks 12 may be an integer-number of times of the scanning pitch. Preferably, for the purpose of easy processing, the repetition cycle should be [scanning pitch]×[the n-th power of 2]×m (m and n are integers not less than 1), or an integer-number of times of the number of dots of a to-be-recorded character in the sub scanning direction, or a value obtained by dividing the number of dots of the to-be-recorded character in the sub scanning direction by an integer. In the meantime, in this embodiment, it was confirmed that the precision of beam position detection was enhanced when the mark repetition cycle was greater than the scanning pitch.

Embodiment 7

FIG. 17 shows another embodiment of the scanning optical apparatus having a plurality of light generating devices for generating beams. In addition to the structural elements shown in the first embodiment, a semiconductor laser 2' for generating another beam is provided. The two semiconductor lasers 2 and 2' have different wavelengths.

The semiconductor laser 2 generates a beam for information recording, and the semiconductor laser 2' a beam for correcting a beam scanning position. Two beams generated by the lasers 2 and 2' travel through the same optical path via a half mirror 26 and are focused on the photoconductor 1. Marks 12 indicating reference positions of beam scanning are provided on the recording region of the photoconductor 1. A long photo detective element (photo-receiving means) 7 covering the entire range of the main scanning region of the beam is situated in parallel to the photoconductor 1. The photosensitive layer 11 is formed of a material having a selective photosensitivity to wavelength of the beam. The information-recording beam from the semiconductor laser 2 is made incident on the recording region of the photoconductor 1, thereby recording image information on the body 1. On the other hand, the scanning position correcting beam is similarly illuminated on the photoconductor 1, and reflection light from the body 1 reaches the photo detective element 7. The operation of the correcting system, which detects a position error signal indicating departure from the optimal scanning position, on the basis of the reflection light incident on the photo detective element 7, and corrects the scanning position of the beam, is the same as that of the first embodiment.

The characteristic structural feature of this embodiment is that a generating unit for generating a beam for scanning position correction is separately provided from a generating unit for generating a beam for information recording, and the beam for scanning position correction has a wavelength less sensitive to the photoconductor. Thus, even if this beam is used to scan the recording region of the photoconductor, recording is not effected on the photoconductor. Accordingly, the beam for scanning position correction is illuminated on the recording region of the photoconductor and the reflection beam is received by the photo detective element, thereby detecting a beam scanning position error on the information recording region of the photoconductor. With this structure, beam scanning position errors due to not only optical but also mechanical factors can effectively be corrected in real time, without affecting the recorded information on the information recording surface.

The above all embodiments are not limited to the scanning optical apparatus using a single beam for information recording, but are applicable to a scanning optical apparatus using a plurality of information recording beams.

Embodiment 8

The optical apparatus of this embodiment is applied to a laser printer, an image input scanner, an exposure apparatus, etc. As an example, a laser printer to which this embodiment is applied will now be described.

FIG. 18 schematically shows the positional relationship between the optical system and the photoconductor of the laser printer. The actual laser printer requires, in addition, a developing device, a transfer device, a cleaning device for the photoconductor, etc. In the laser printer using the scanning optical apparatus of the present invention, such devices are not important and therefore the description thereof is omitted.

In FIG. 18, beams are emitted from semiconductor lasers 2 arranged in the sub scanning direction, and are converted to parallel beams through a collimator lens 3. The parallel beams, which have passed the collimator lens 3, have parallel optical axes. The parallel beams pass through a beam splitter 18. The beams are converged by a cylindrical lens 4 so that the beams have beam waists on a polygonal mirror 5 in the sub scanning direction. Subsequently, the beam reflected by the polygonal mirror 5 passes through an f$\theta$ lens 6 and is illuminated on a photoconductor 1.

FIGS. 19A and 19B illustrate the extension of beams in the sub scanning direction. The semiconductor lasers 2 and 2' are arranged vertically (in FIGS. 19A and 19B). In FIG. 13A, the beam from the upper semiconductor laser 2 is indicated by hatched lines; in FIG. 13B, the beam from the lower semiconductor laser 2' is indicated by hatched lines. By situating the two laser diodes at a close distance, the two beams are compounded on the photoconductor 1. By using the composite beam spot, the intensities of the beams are varied to vary the shape of the composite beam spot.

In this embodiment, the ratio in light quantity of two beams illuminated on the photoconductor at a short distance in the sub scanning direction is controlled, thereby varying the shape of the beam spot and substantially shifting the center of the beam spot in the sub scanning direction. Thus, "face inclination (polygonal mirror facet error)" of the beam is corrected. For this purpose, the beam pitch must be smaller than the diameter of each beam spot. In the semiconductor laser array, the beam diameter on the light-emission surface is about 1 $\mu$m whereas the beam pitch is about 100 $\mu$m. Thus, when the beam is focused on the photoconductor 1, the beam diameter is too greater than the beam pitch. In this situation, according to the present embodiment, the photoconductor 1 is situated more closer to the focus than to the image-formation surface, so that the beam diameter becomes substantially equal to the beam pitch. With this structure, the beam is not focused on the photoconductor 1, but there is no problem since a "face inclination correcting lens" is not used. In this embodiment, the f$\theta$ lens 6 functions in both main scanning direction and sub scanning direction; however, two lenses having different functions may be used.

Marks 12 indicating the beam scanning position is provided in advance on that part of the photoconductor 1, which is outside the image recording region. In FIG. 18, the marks 12 are provided on the end portion of the photoconductor 1 at which the beam scan is started. The beam reflected by the part of the photoconductor 1 where the marks 12 are formed reaches the photoreceiving section 7. The photo-receiving section 7 has an opening large sufficiently greater than the beam diameter so as to receive all reflected beam from the photoconductor 1.

Figure 20A:
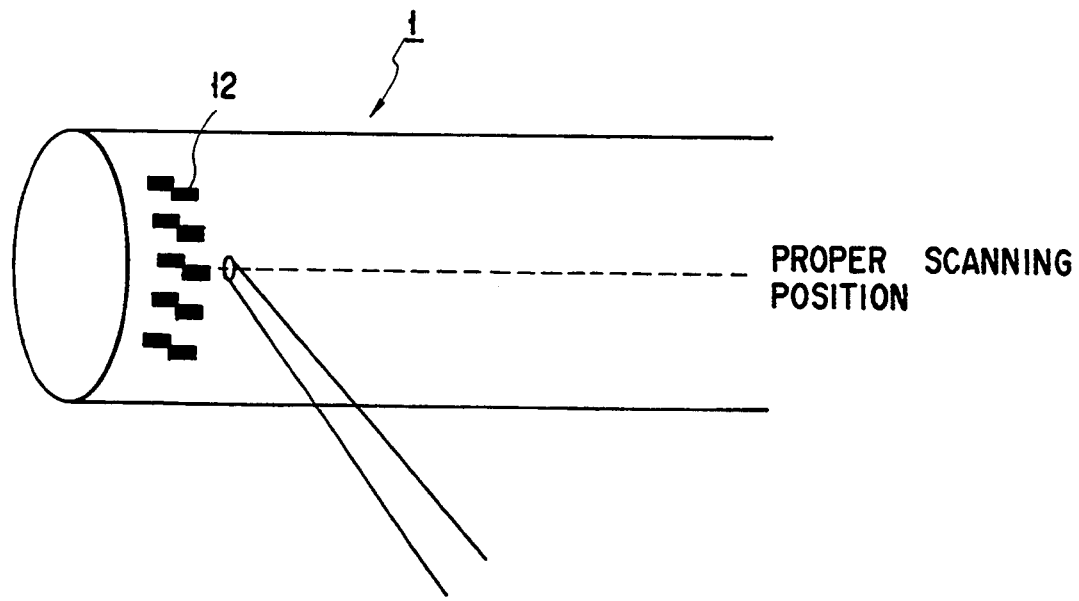
FIGS. 20A and 20B illustrate schematically the relationship between the marks on the photoconductor and beams.
Figure 20B:
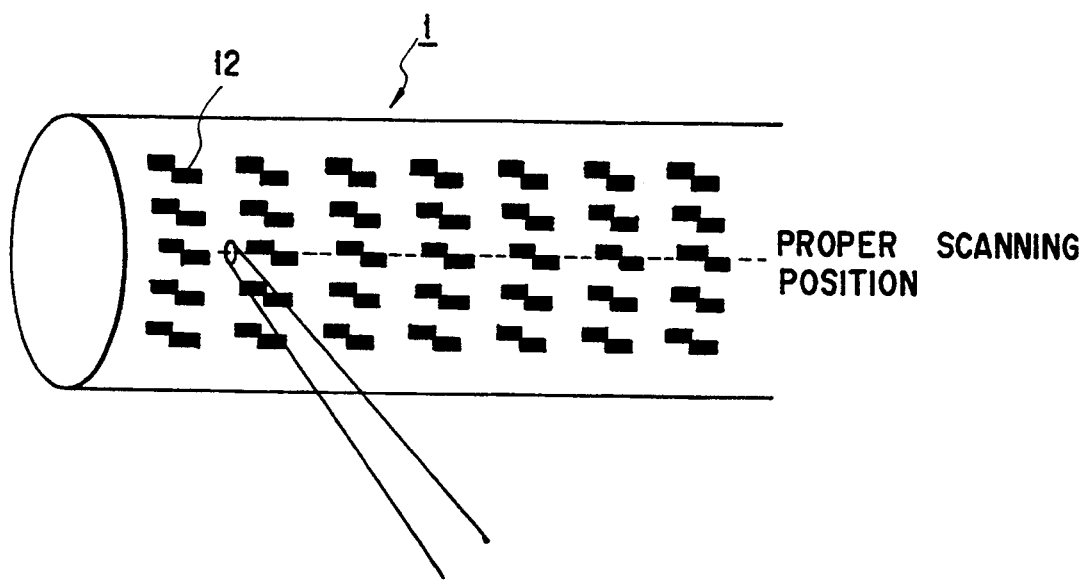
Figure 21:
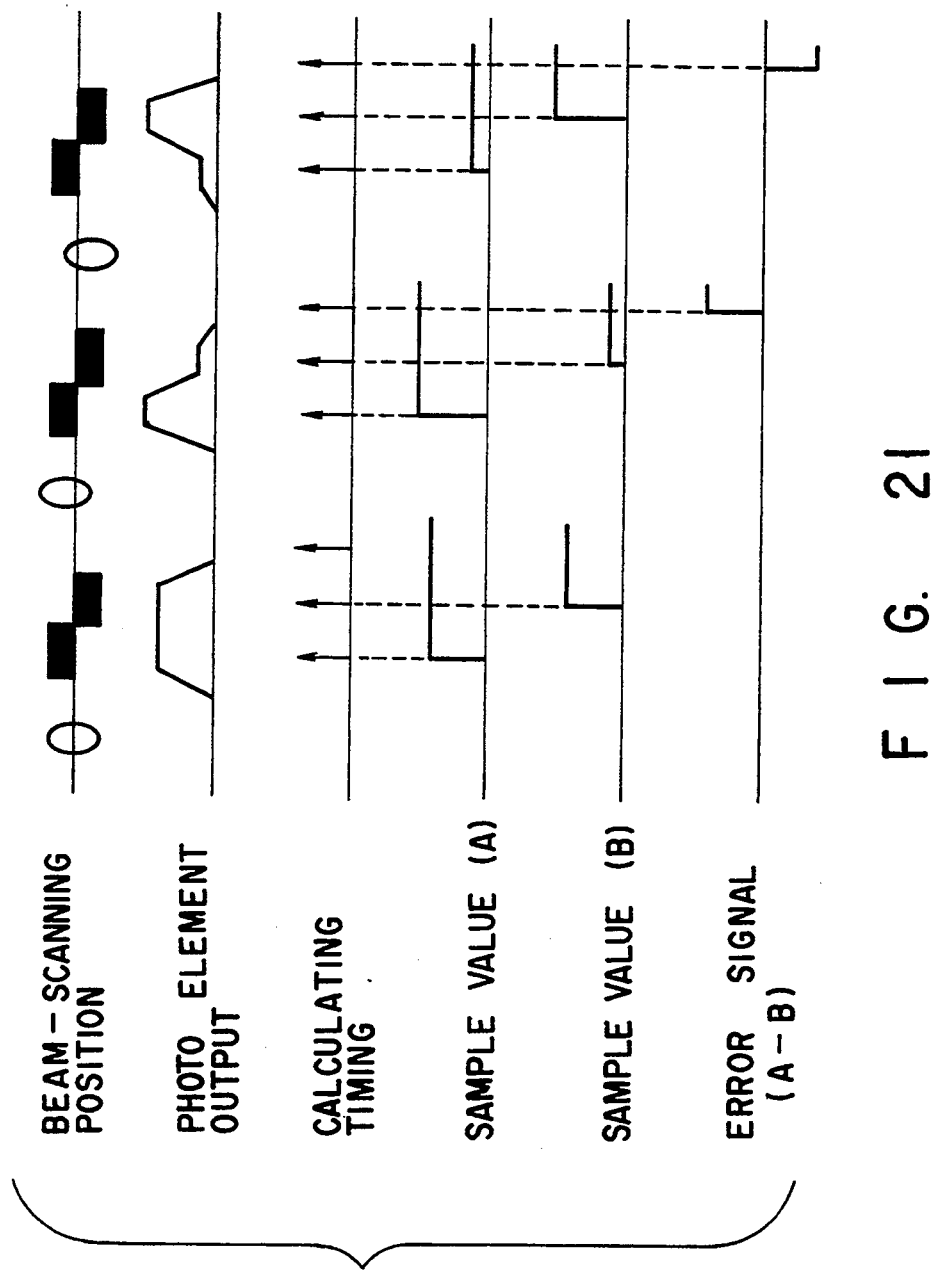
FIG. 21 illustrates scanning position errors and outputs of a light-receiving unit.

FIGS. 20A and 20B show the relationship between the marks 12 on the photoconductor 1 and the beams. In FIG. 20A, the marks 12 are arranged on the photoconductor 1 in a staggered manner in the sub scanning direction at the pitch equal to the recording density in the sub scanning direction. The marks 12 are formed of a material having a reflectance different from that of the photoconductor 1. A scanning position error signal is obtained by comparing the intensities of successive pulses generated from the photo detective element 13 (see FIG. 21). Specifically, a value (A−B) obtained by subtracting a sampling value (B) of the second pulse from a sampling value (A) of the first pulse output from the photo detective element is delivered to the controller 8 as an error signal E corresponding to the departure of the beam from the optimal position.

Based on the error signal, the controller 8 varies the ratio in light quantity of the two beams, thereby varying the shape of the composite beam spot and shifting the center of the beam spot. This system has a high-speed control property and high stability, compared to the system wherein optical elements along the optical path are mechanically moved to incline the optical axis. In addition, the optical path of the respective beams do not vary before and after the beams are displaced. Thus, the optical path of the composite beam is less varied. Compared to the system wherein the optical axis of one beam is inclined and displaced, the beam reflected by the photoconductor can be detected by a small photo detective element. FIG. 20B shows an embodiment wherein marks are arranged over the entire surface of the photoconductor 1.

Figure 22:
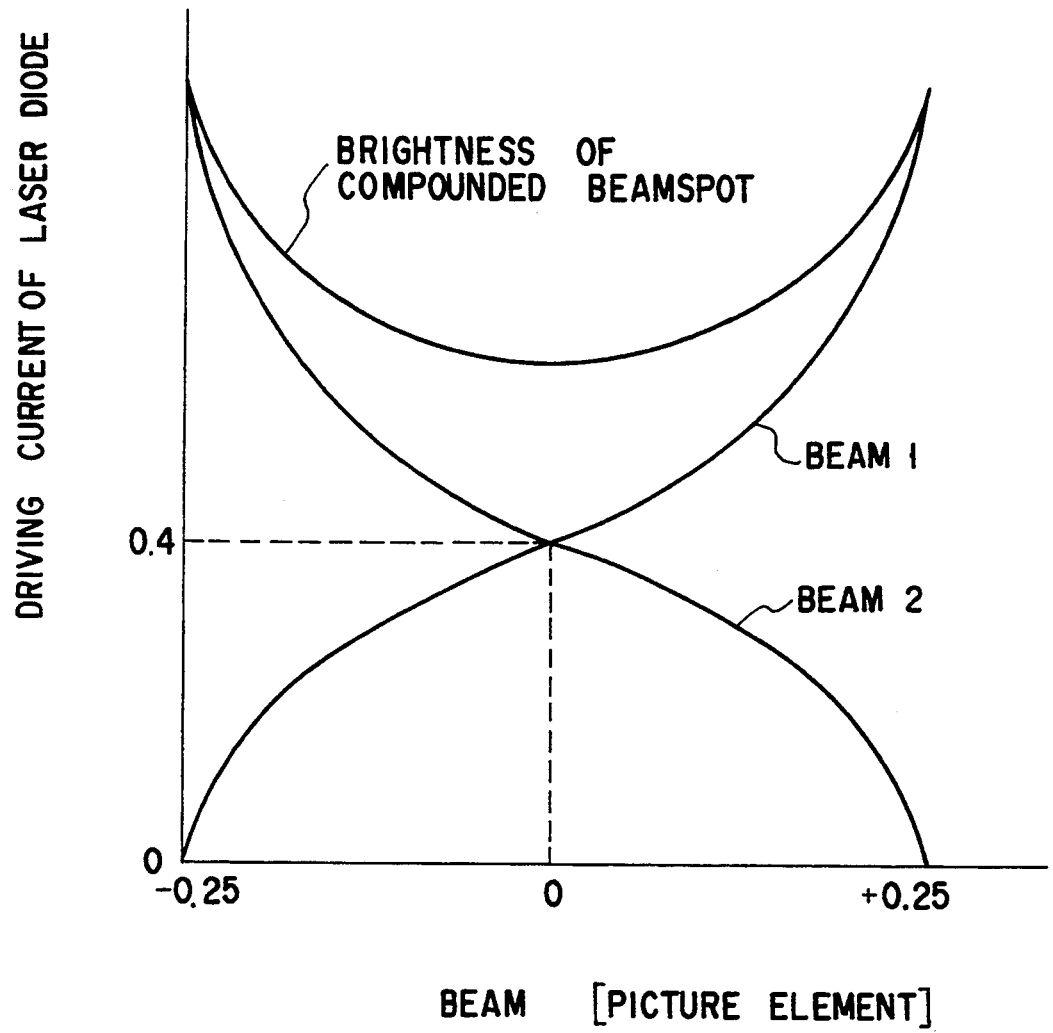
FIG. 22 is a graph showing the relationship between the light quantity ratios and beam displacement amounts of two beams.

FIG. 22 shows the relationship between the driving currents of two semiconductor lasers and the brightness of the beam spot. The light quantity (brightness) of the beam spot of the compounded beam of beam 1 and beam 2 can be adjusted by varying the driving currents of the semiconductor lasers. Specifically, an electric current generated from a constant current source is divided into two driving currents. According to this method, however, the size of an electrostatic latent image formed on the photoconductor 1 is not constant. That is, the light quantity (brightness) of the compounded beam spot is greatest when the light quantities of the two beams are equal and decreases as the beam is deflected to either side of the beam spot. This tendency depends greatly on the ratio of the spot diameter and the beam pitch on the photoconductor 1, and become conspicuous as the beam pitch increases. For example, when the beam pitch is half the spot size, the current required to form a latent image of the same size by using a single beam is about "1.25" when the total current for uniform illumination is "1". In addition, the displacement amount of the beam does not have a linear relationship with the variation in driving current of the laser diode. As the beam spot is displaced to one side, it is necessary to increase the variation in driving current for varying the illumination light quantity by the same amount.

The present embodiment is directed to the system wherein the ratio in light quantity of two beams is varied. As a modification of this embodiment, the illumination time (driving pulse width) of the two beams may be varied. In order to obtain the light quantity required for photosensitizing the photoconductor 1, the beams must be irradiated for a predetermined time. Thus, by suitably controlling the driving time of the two semiconductor lasers, the beam spot can be displaced in real time.

Figure 23A:
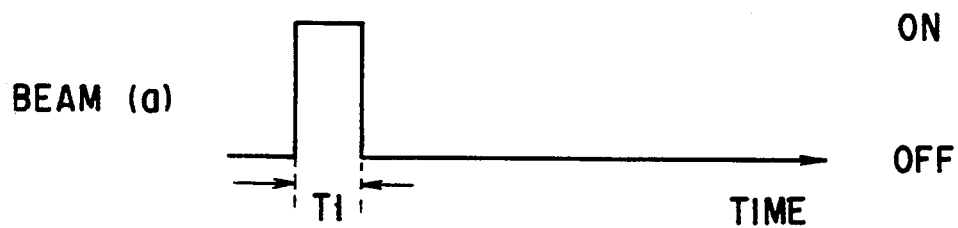
FIGS. 23A and 23B are timing charts showing driving time periods of beams.
Figure 23B:
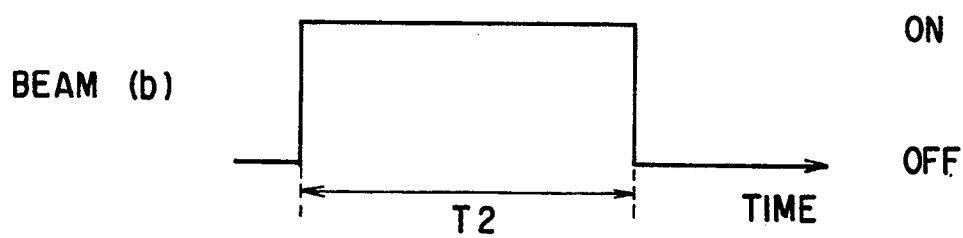
Figure 23C:
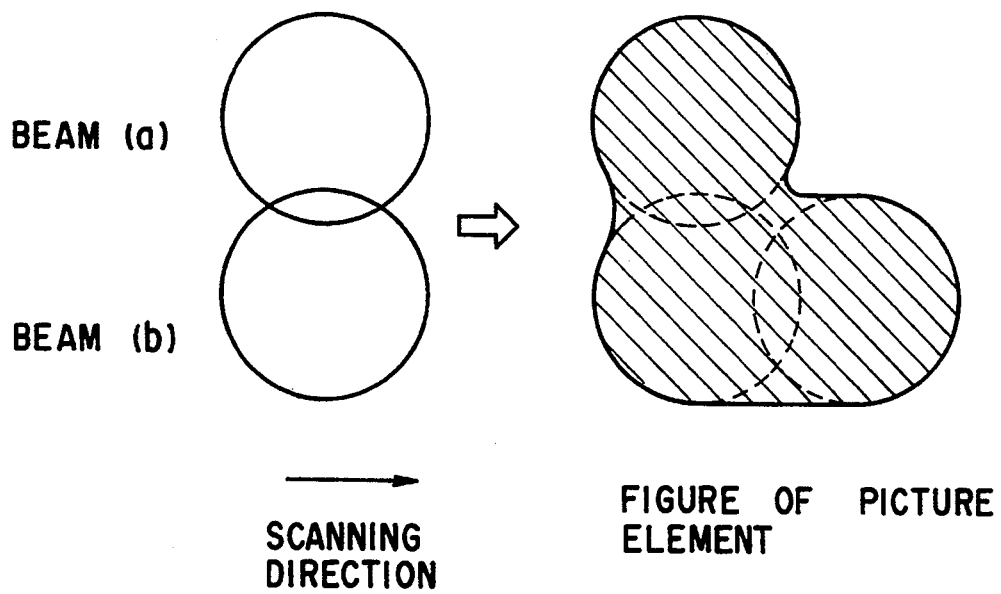
FIG. 23C illustrates the principle of beam spot formation by means of driving time control.

FIGS. 23A and 23B are timing charts of ON/OFF of beams controlled by the laser driving time, and FIG. 23C illustrates the principle of formation of the beam spot. Two semiconductor lasers 2 and 2' can be driven at different times. In FIG. 23A, a beam (a) is ON at time T1; in FIG. 23B, a beam (b) is ON at time T2. FIG. 23C shows the shapes of beams (a) and (b). The shape of a picture element formed by scanning the two beams on the photoconductor at times T1 and T2 is shown in the hatched portion on the right part of FIG. 23C. The formed picture element is unbalanced towards the beam (b) and is eccentric, as compared to a picture element formed by scanning the two beams at the same time.

Figure 24A:
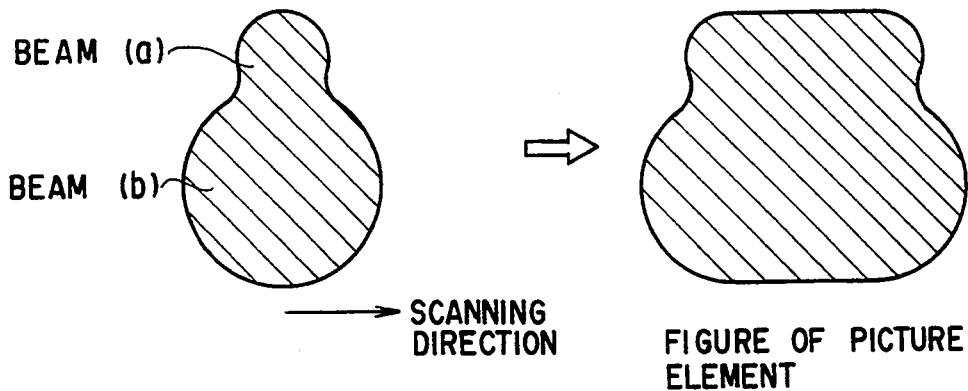
FIG. 24A illustrates the principle of beam spot formation by means of beam amount control, and FIG. 24B the principle of beam spot formation by means of driving time control.
Figure 24B:
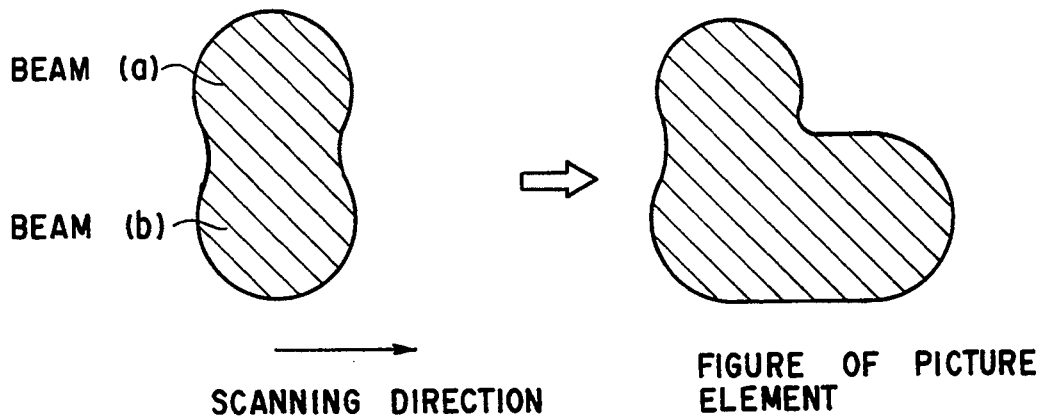

FIGS. 24A and 24B illustrate the formation of the beam spot by "light quantity control" and the formation of the beam spot by "laser driving time control." FIG. 24A shows the state wherein the light quantities of beams (a) and (b) are varied to change the shape of the compounded beam spot. In this example, the light quantity of beam (b) is increased and that of beam (a) is decreased, so that the center of the beam spot is displaced towards the beam (b). The picture element (in the right part of FIG. 24A) formed by the beam spot is eccentric towards the beam (b).

On the other hand, as is shown in FIG. 24B, according to the compounded beam spot formed by "laser driving time control", the driving times of beams (a) and (b) are suitably varied to change the shape of the formed picture element. The driving time of the beam (b) is longer and that of the beam (a) is shorter. The center of the formed picture element is displaced towards the beam (b).

In both methods, the center of the picture element is displaced, and it can be considered that the beam spot is substantially displaced to form the picture element. The formed picture element does not have good symmetry; however, from the macroscopic viewpoint, it is considered that the center of the picture element is displaced, and the picture element can substantially displaced by these methods.

The beam scanning position is controlled only at the beginning portion (outside the recording region) of one scan line, as shown in FIG. 20A. While one line is scanned, the light quantities of two beams are kept constant. The beams pass over the optimal position indicated by marks 12 and scans the recording region. However, for more exact scanning, the marks 12 are arranged on the entire to-be-scanned surface of the photoconductor 1 (including the recording region), as shown in FIG. 20B. While continuing scanning position control (in the scan direction on the photoconductor), the beams are scanned over the photoconductor 1. In this case, the light quantities of the beams are controlled by controlling the beam strength (FIG. 9) or by controlling the time of illumination on the photoconductor 1. If the "pitch" in the main scan direction of the marks 12 on the photoconductor 1 is set at an integer-number of times of the picture point recording pitch or at a value obtained by dividing the picture point recording pitch by an integer, the scanning position error can be detected at every time point corresponding to an integer-number of times of the recording pitch or at a value obtained by dividing the recording pitch by an integer. Thus, the beam position can easily be controlled.

As been stated above, the marks indicating the scanning position are formed over the entire to-be-scanned surface of the photoconductor 1, the light quantities on the photoconductor 1 is measured, and the ratio in light quantity of the two beams is varied on the basis of the measured value, thereby restoring the beams at the optimal scanning position. Thus, the beam scan can be performed more exactly.

The present embodiment is directed to the case where two beams are employed. It is possible, however, to use three or more beams and to compound these beams, thereby forming a beam spot. In this case, too, the beam scanning position error detection according to the present invention is utilized, whereby the scanning position error can be corrected easily and quickly.

FIG. 25 shows the structure of an embodiment wherein a beam splitter is not used. A reflection beam from the photoconductor 1 is received by a photo detective element 7. Thus, the error in scanning position is detected. The photo detective element used in this embodiment may have the structure comprising two photo detective elements, as shown in FIG. 2, or the structure comprising four photo detective elements, as shown in FIG. 7. In addition, it is possible to compound two or three or more beams by using the error detection system, as shown in FIG. 23, thereby forming a compounded beam spot and varying the scanning position.

Figure 26A:
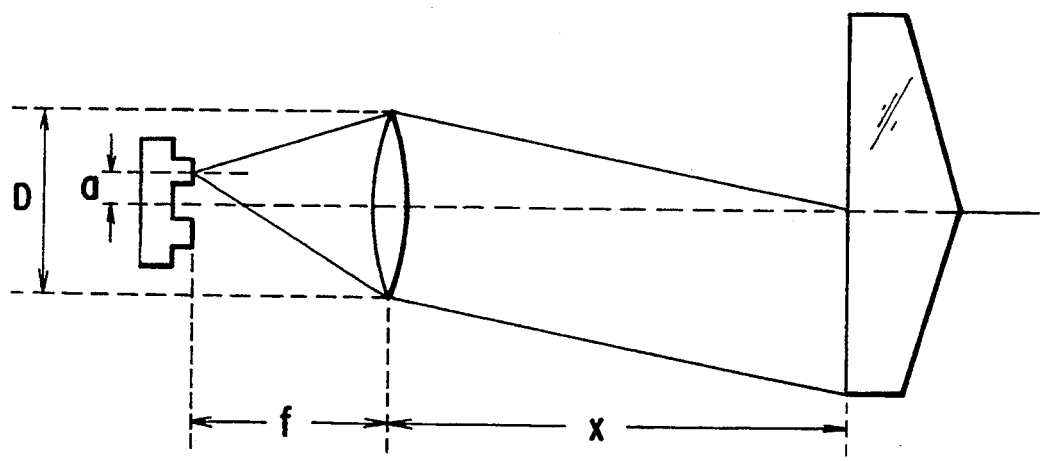
FIG. 26A shows the structure of an embodiment wherein a prism is inserted in the optical system.
Figure 26B:
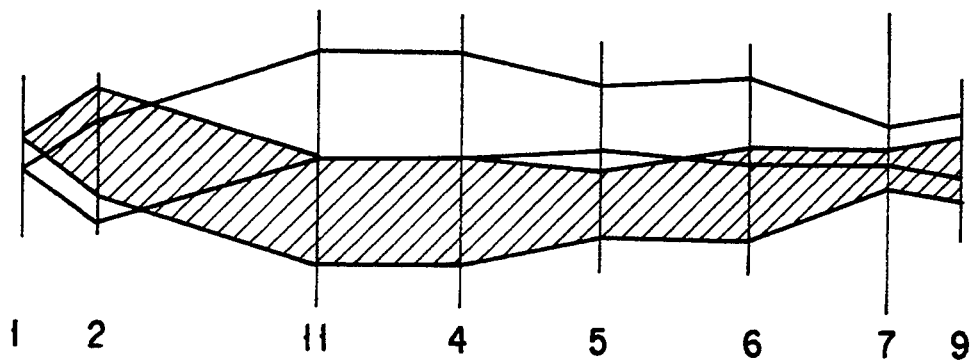
FIG. 26B illustrates the extension of the light beam in the sub scanning direction of the beam in this case.

FIGS. 26A and 26B show an embodiment wherein a prism 27 is inserted in the optical system so that photo beams from two light sources can enter the cylindrical lens 4 with their axes kept parallel, when the beam splitter 18 is not used. FIG. 26A shows a locus of a beam in the case where a prism is inserted after a collimator lens. This embodiment meets the following equation:

$$x = (f \cdot D)/(2a)$$

where
  f = the focal distance of the collimator lens 3,
  D = the diameter of the collimator lens 3, a = the distance between the optical axis of the collimator lens and the opening of the semiconductor laser, and x = the distance between the collimator lens and the prism.

For example, when f=5 (m m), D=3 (mm) and a=0.15 (mm), x=50 (m m). FIG. 26B shows the loci of the beams from the two semiconductor lasers in this case. As shown in FIG. 26B, by inserting the prism, the loci of the two beams can easily be approached to each other. Thus, it is easy to compound and illuminate the beams on the photoconductor 1.

Embodiment 9

Figure 27:
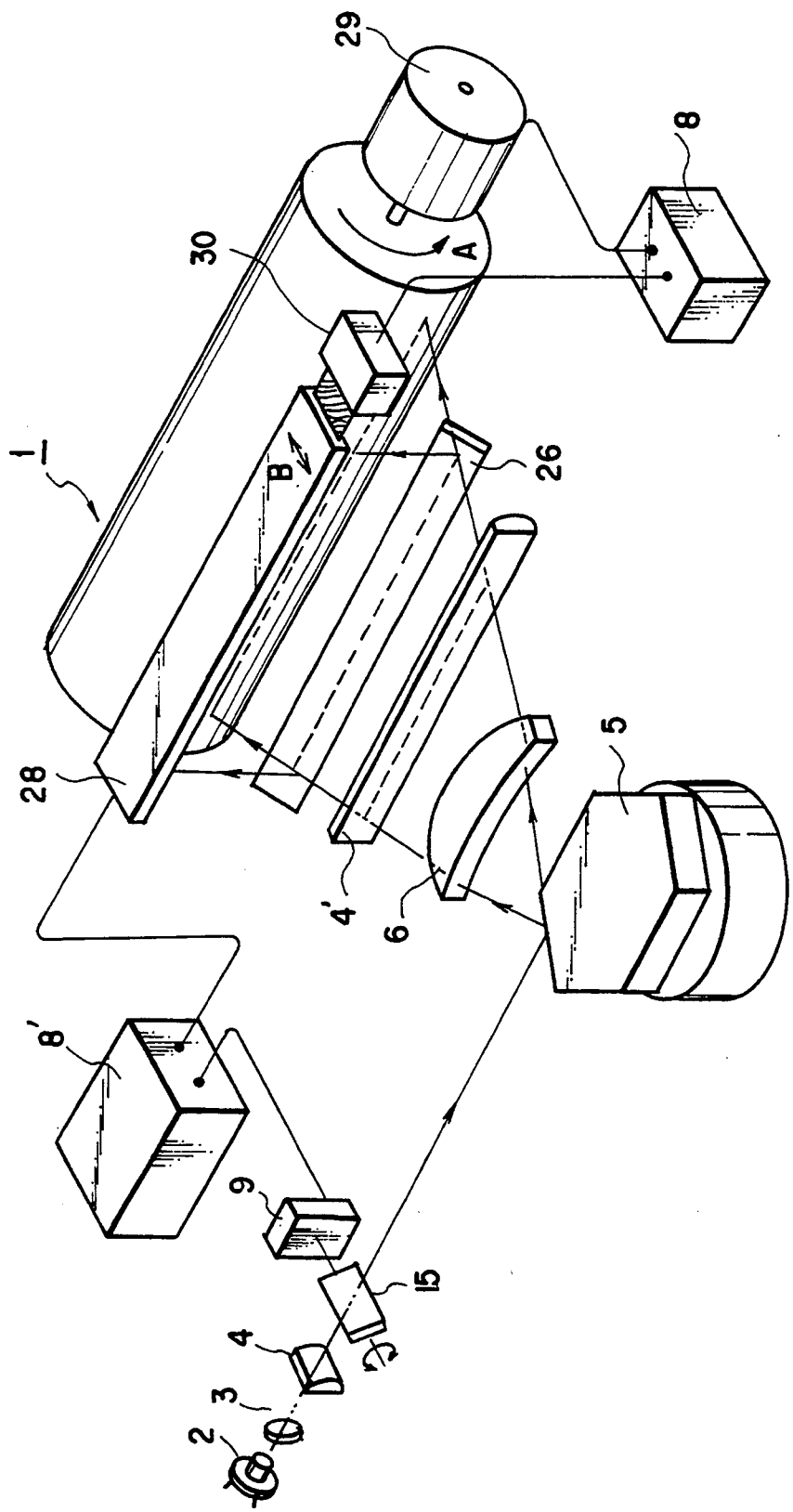
FIG. 27 shows schematically the structure of an embodiment of the invention.

FIG. 27 shows schematically an optical system and a photoconductor of a laser printer to which the present invention is applied.

A beam is emitted from a semiconductor laser 2. The beam is converted to a parallel beam through a collimator lens 3. The beam is converged by a cylindrical lens 4 into a line image extending on a polygonal mirror 5 in the main scanning direction. Then, the beam reflected by the polygonal mirror 5 passes through an fθ lens 6 and a half mirror 26. The beam is then irradiated on a photoconductor 1.

The fθ lens 6 has a so-called "fθ characteristic" in the main scanning direction, by which the scan speed Of the beam on the photoconductor 1 is proportional to the rotational speed of the polygonal mirror 5, and a characteristic by which the beam is restricted in the main scanning direction on the photoconductor 1. Thereby, a desired stop size is obtained on the to-be-scanned surface. The cylindrical lens 4 is a cylindrical optical lens having power only in the sub scanning direction. The polygonal mirror 5 and the photoconductor 1 have an optically conjugate relationship. The beam is branched by the half mirror 26 and is irradiated on a scale 28.

The scale 28 has marks (not shown) indicating a reference beam scanning position. The optical distance between the half mirror 26 and the scale 28 is equal to that between the half mirror 26 and the photoconductor 1. A photo detective element 13 moves in the direction of arrow B in accordance with the variation in rotational speed of the photoconductor 1. Specifically, the rotation of the photoconductor 1 is detected by a rotary encoder 29. A controller 8 compares the output pulse from the rotary encoder 29 with a "standard clock", and the comparison result is sent to a scale driver 30. The scale driver 30 moves the scale 28 in the direction of arrow B by a suitable distance.

The scale 28 converts the position data of the scanned beam to an electric signal, and transmits the electric signal to the controller 8. On the basis of the position data of the scanned beam, the controller 8 computes correction data of the scanning position to cause the beam to scan at the optimal position, and sends a corresponding correction signal to a driver 9. The driver 9 rotates a mirror 31 by a predetermined angle on the basis of the input signal, and slightly displaces the optical axis of the beam in the sub scanning direction.

That portion of the scale 28, on which the marks are provided, has a reflectance which is proportionally different from the reflectance of that portion of the scale 28 on which the marks 12 are provided. When the beam is made incident on the scale 28, the reflection beam can be received by the photo detective element since the reflected light quantity of the portion with marks 12 differs from that of the portion without marks 12. In addition, since the received light quantity differs in accordance with the beam scanning position on the basis of the presence/absence of the marks, the light quantity relating to the beam scanning position can be measured by detecting the received light quantity.

In the present embodiment, the object to be measured is the reflection beam; however, the object to be measured may be the light which has passed the marks.

FIGS. 28A to 28D show embodiments of marks formed on the scale 28 shown in FIG. 27. A broken line 16 indicates an optimal scanning position of a beam.

Figure 28A:
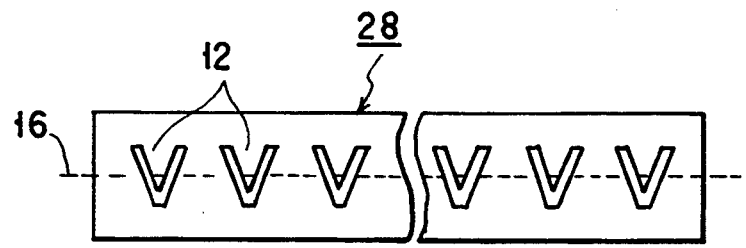
FIGS. 28A to 28D partly show examples of mark patterns.

The scale shown in FIG. 28A has a plurality of V-shaped marks 12 on its front side. A photo detective element 13 (not shown) is provided on the rear side of the scale 28. Optical guide means such as an optical fiber or lens may be used to guide the light, which has passed the scale 28, to the photo detective element.

Figure 28B:
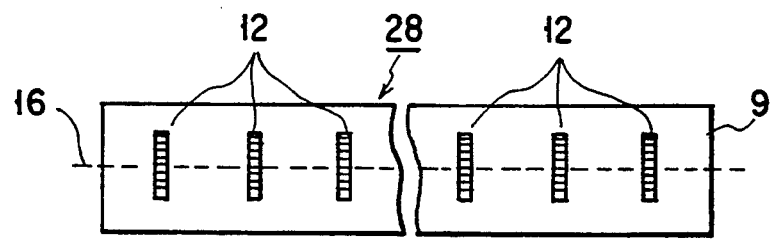

The scale shown in FIG. 28B has a plurality of marks 12 which extend in a direction substantially perpendicular to the main scanning direction of the beam. Photoelectric conversion elements (not shown) such as CCDs are arranged at regular intervals on the rear side of the marks 12.

Figure 28C:
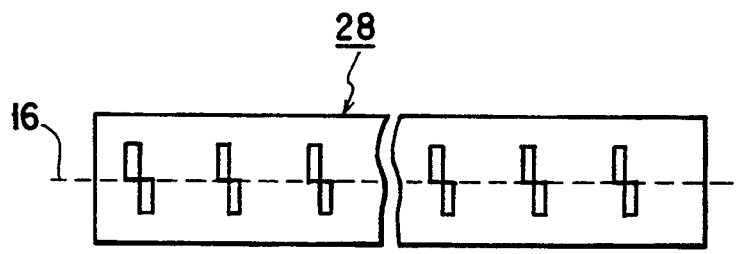

The scale shown in FIG. 28C has a plurality of marks 12 symmetrically in respect of the optimal scanning position. Thereby, the error of the scanning position can be detected.

Figure 28D:
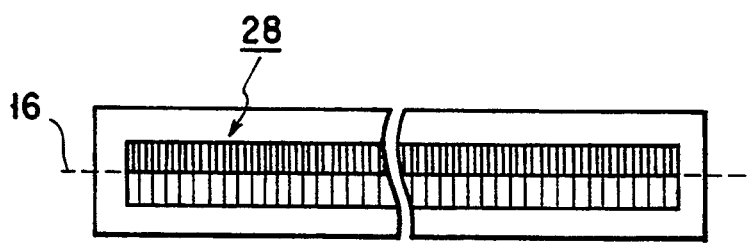

The scale shown in FIG. 28D has two types of marks 12 having different spatial frequencies symmetrically in respect of the broken line 16 indicating the optimal scanning position.

The principle of the beam scanning position error correction using the above marks will now be described with reference to FIGS. 29 to 32.

A V-shaped mark 12 on the scale shown in FIG. 29 is an enlarged mark of FIG. 28A. The photo detective element (not shown) is provided on the rear side of the scale.

An optical scanning line of the beam corresponds to a center line (b) of the mark 12. A scanning line deviating upward on the V-shaped mark is indicated by a line (a), and a scanning line deviating downward is indicated by a line (c). The lower part of FIG. 29 show patterns of currents generated when the beam scans the lines (a), (b) and (c). Specifically, when the scanning line (b) is scanned, a generated current pattern having two peaks at an interval corresponding openings of the v-shaped mark is obtained. Photoelectrically converted current pulses corresponding to the openings are generated at an interval. The interval between the pulses is detected. If the current pulses are generated at a predetermined interval, it is determined that the beam is scanned at the "optimal scanning position."

When the scanning line (a) is scanned, the interval between openings in the mark is greater than the interval between openings along the line (b). Accordingly, the interval between photoelectrically converted current pulses is greater than in the case where the optical scanning is performed. As the scanning position error from the optical scanning position increases, the interval between generated current pulses increases. Thus, by detecting the interval between pulses, the magnitude of the scanning position error can be detected.

By contrast, when the scanning line (c) is scanned, the interval between the openings in the mark is less than in the case of the line (b). Thus, the interval between photoelectrically converted current pulses is smaller than in the case where the optical scanning is performed. As the scanning position error from the optical scanning position increases, the interval between generated current pulses decreases. Thus, by detecting the interval between pulses, the magnitude of the scanning position error can be detected.

If the scanning position error increases excessively and the interval between the openings is lost, the beam is not separated during scanning. As a result, only one current pulse is generated. Consequently, the error cannot be detected on the basis of the interval between generated current pulses. In this case, the pulse width of the overlapped current pulses is detected, thereby detecting the deviation amount from the optical scanning position.

In the above case, the mark may be provided over the same range as the width of the beam scanning range, or over a part of the width of the beam scanning range.

When the scanning position is controlled over the entire range of the beam scanning width, the light quantity of the beam must be controlled. If the beam for scanning position control is irradiated on non-recording picture points, erroneous recording may be effected. It is therefore necessary to lower the intensity of the beam at the non-recording picture points, when the scanning position is controlled. The photoconductor in the embodiment has a non-linear sensitivity to the beam light quantity; thus, the photoconductor is hardly sensitive to a beam of less than a predetermined intensity level. Accordingly, if the beam is set at a predetermined intensity level or less, no picture information is recorded at the non-recording picture points on the photoconductor by irradiation of the beam.

When the scanning position control is performed over only a part of the scanning width in the main scanning direction, it suffices to provide only a small photo detective element, resulting in advantages with respect to the cost of the photo detective element, manufacturing efficiency and installation error. In particular, when the scanning position control is performed only at the non-recording region on the scan starting side, it is not necessary to control the light quantity of the beam, and the structure of the control circuit can be simplified.

Figure 30:
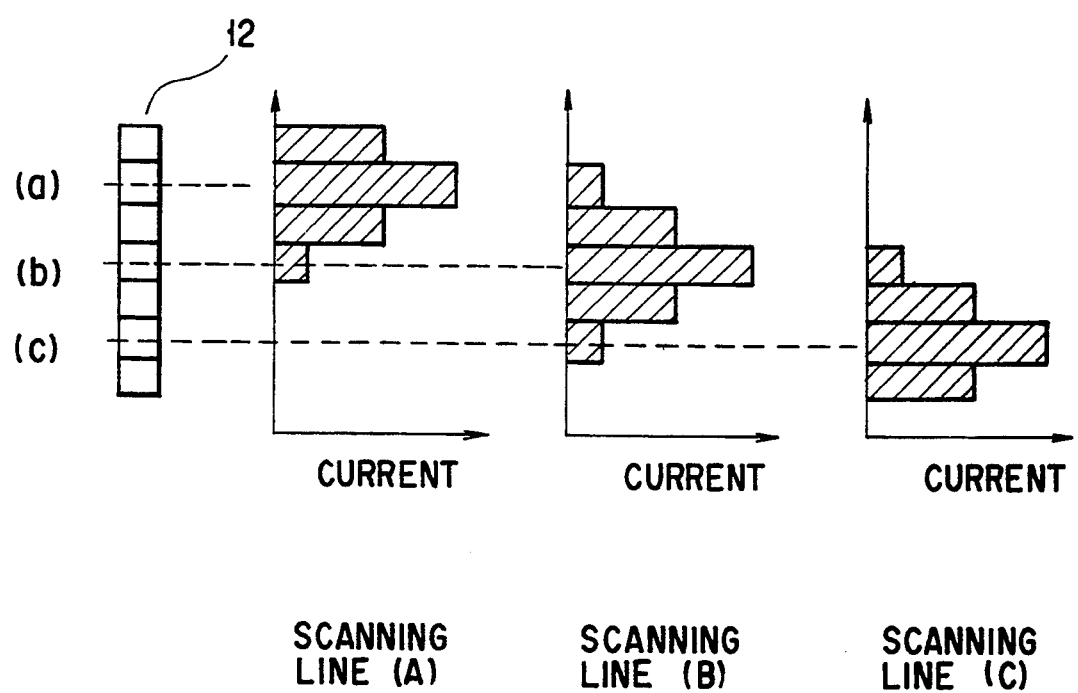
FIG. 30 illustrates a method of detecting an error by means of marks.

FIG. 30 illustrates the principle of the beam scanning position error detection using a one-dimensional optical sensor array (e.g. photoelectric conversion elements) arranged in the sub scanning direction, as shown in FIG. 28B. Now suppose that a scanning line (b) indicates the optimal scanning position. In a generated current pattern obtained when the beam scans the line (b), a highest current is generated from the photoelectric conversion element on the scanning line (b). On the other hand, when the beam scanning position deviates towards a scanning line (a), the current pattern produced by the photoelectric conversion element shows a characteristic shifted towards the line (a). By contrast, when the beam scanning position deviates towards a scanning line (c), the current pattern produced by the photoelectric conversion element shows a 10 characteristic shifted towards the line (c). Thus, the current pattern produced when the beam scans the optical scanning position is stored in a memory as a reference current pattern. The reference current pattern is compared with a generated current pattern produced when the beam is scanned, thereby finding the direction of the sub scanning error on the basis of the direction of the deviation of the generated current peak. Simultaneously, the magnitude of the scanning error can be detected on the basis of the magnitude of the deviation of the generated current peak.

The magnitude of the error can be detected by detecting the scanning position error on the basis of the variation of the generated current pattern and by detecting the position of the peak value of the current pattern.

Figure 31:
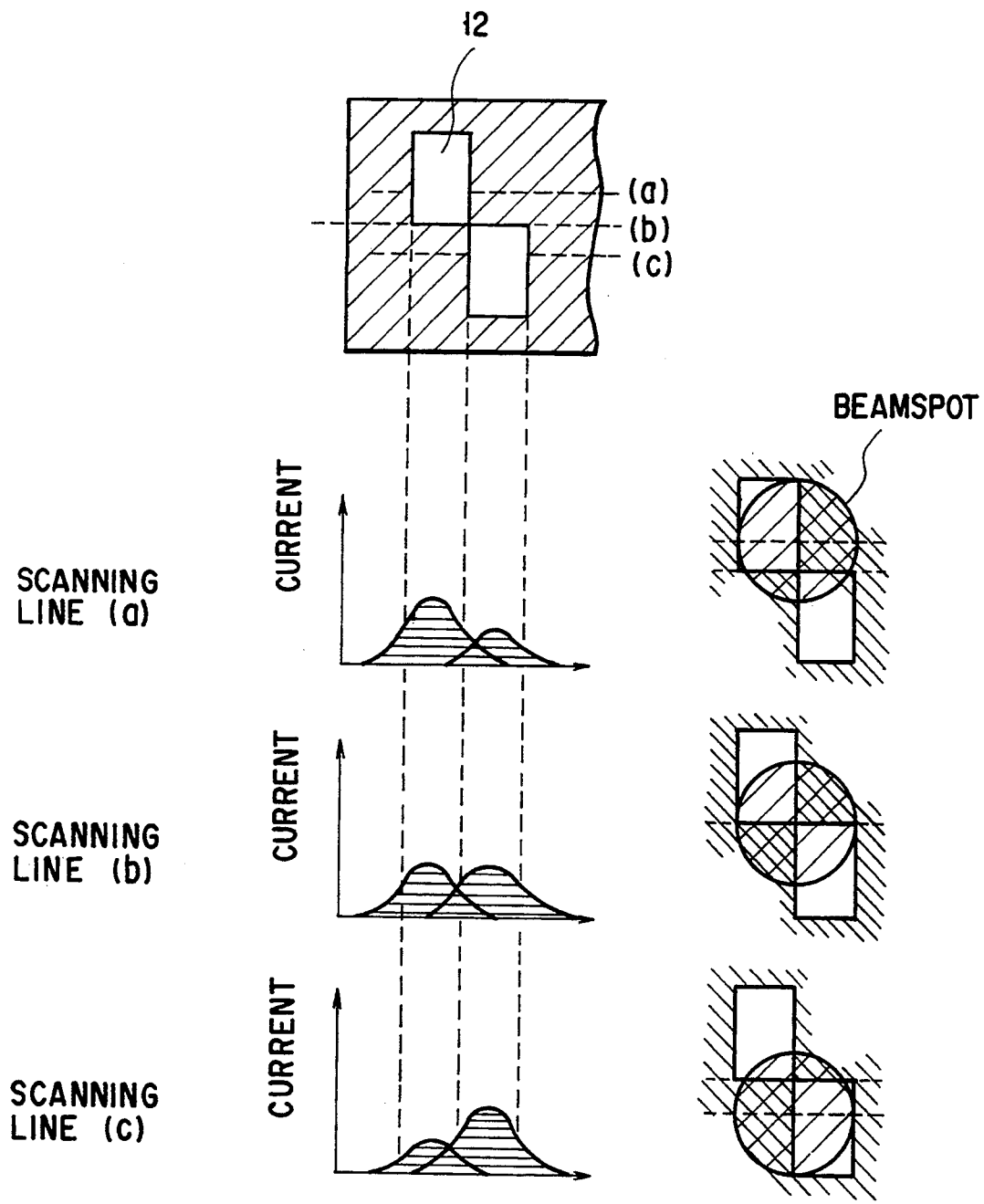
FIG. 31 illustrates a method of detecting an error by means of marks.

FIG. 31 illustrates the principle of the method of detecting the scanning position error of the beam by using the mark 12 shown in FIG. 28C. The mark 12 can be obtained by forming openings on the beam illumination surface of the scale. Photoelectric conversion elements are situated on the rear side of the openings. The openings are uniformly formed along an optimal scanning line (b) of the beam. When the optical scanning line (b) is scanned, beams are equally emitted from the openings formed uniformly along the line (b) and are made incident on the photoelectric conversion elements. Thus, the waveform of the current corresponding to the openings have equal peaks. On the other hand, when the beam scanning position is shifted towards a scanning line (a), the light quantity from the opening on the shifted-position side increases, and the quantity of the current generated from the photoelectric conversion element increases accordingly. Simultaneously, the light quantity from the opening on the opposite side in respect of the reference scanning line decreases. Thus, the quantity of current from the photoelectric conversion element decreases. Accordingly, when the patterns of the currents generated from adjacent openings are equal, the equal quantities of light are emitted from these openings; therefore, the beam scans the optimal scanning position. This means that there is no displacement in the sub scanning direction. If the patterns of the currents generated from adjacent openings are unbalanced, the illuminated light quantity is greater on the current peak side. The shift of the beam scanning position can be detected from the variation in current.

FIG. 32 illustrates the principle of the method of detecting the scanning position error when the marks with different spatial frequencies, as shown in FIG. 28D, are used. FIG. 32A shows examples of mark patterns with different spatial frequencies. The interval between the marks is on the same order as the diameter of the beam spot. The quantities of light incident on the photo detective elements are different between the portion with marks and the portion without marks. Thus, by scanning the beam, the amplitude of generated current varies. If the marks provided on the scale vary cyclically, the amplitude of current generated from the photoelectric conversion element in accordance with the beam scanning position varies cyclically. The cycle of the current variation corresponds to the cycle of marks on the scale. If marks with different spatial frequencies are provided, the frequencies of the amplitude variations of the resultant currents are different.

Figure 32A:
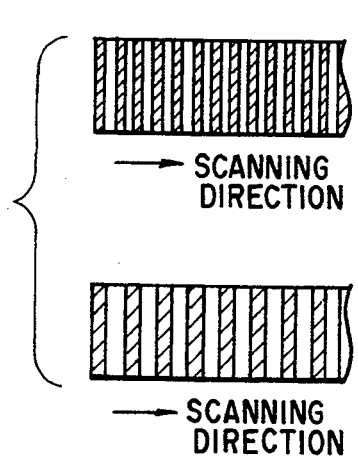
FIGS. 32A to 32D illustrate methods of detecting an error by means of marks.
Figure 32B:
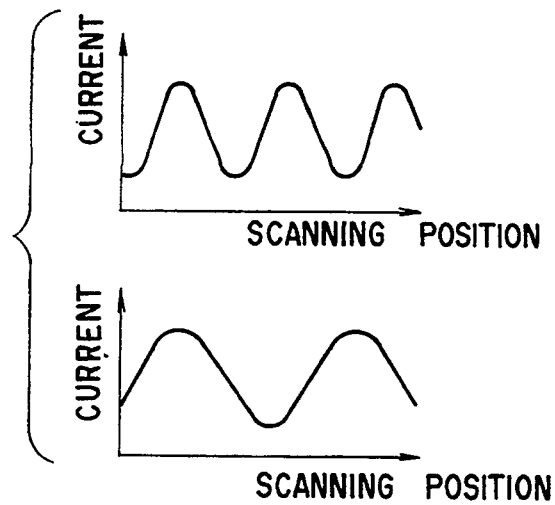
Figure 32C:
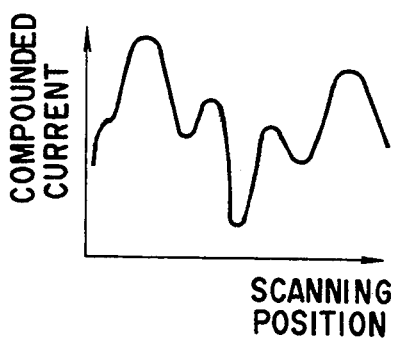
Figure 32D:
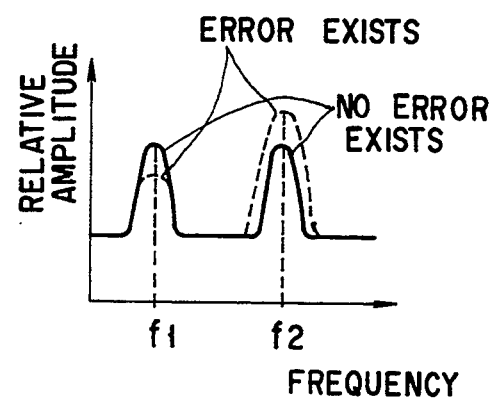

Accordingly, when the scale having marks with different spatial frequencies is scanned by the beam, a generated current waveform having a predetermined width obtained from the photo detective element is detected (FIG. 32C), and the waveform is subjected to frequency analysis such as FFT (fast Fourier transform). Thus, a frequency characteristic having a peak at a specific frequency, as shown in FIG. 32D, can be obtained. If the beam scanning position varies in the sub scanning direction, a response to the current corresponding to the mark having a specific spatial frequency increases, and a response to the current corresponding to the mark having another spatial frequency decreases. The waveform of the current generated when the optical scanning position is scanned, or the waveform indicating the frequency characteristic after frequency analysis, is recorded in a memory in advance, and the frequency characteristic data is stored. Then, by comparing the frequency response biased to the specific frequency with the stored waveform, the variation in scanning position of the beam can be detected.

Further, the quantity of light incident on the photo detective element can be controlled by the width of the mark defining the spatial frequency. Specifically, the reflection light quantity differs on certain marks. If the ratio of the area on the scale occupied by the marks is varied, the quantity of light incident on the photo detective element can be varied. In addition, the quantity of current generated from the photo detective element can be varied suitable. By suitably setting the width of the mark, the quantity of current generated from the photo detective element can suitably be varied, such that equal currents are generated in connection with the marks having different spatial frequencies.

In the above case, it is designed that equal currents are generated in connection with the marks having different spatial frequencies. Thereafter, the compounded current is frequency-analyzed, and amplitudes at respective frequencies are compared. Thereby, the direction of the scanning position error and the magnitude of the position error can be detected. According to this embodiment, the error can be detected only by comparing the measured current waveforms or waveforms representing frequency characteristics, without referring to the measurement result obtained when the beam spot scans the optimal scanning position.

As stated above, the scale having marks of various shapes is provided separately from the photoconductor. By moving the scale in accordance with the variation in rotational speed of the photoconductor, the scanning position error of the beam can be corrected in real time.

Embodiment 10

Figure 33:
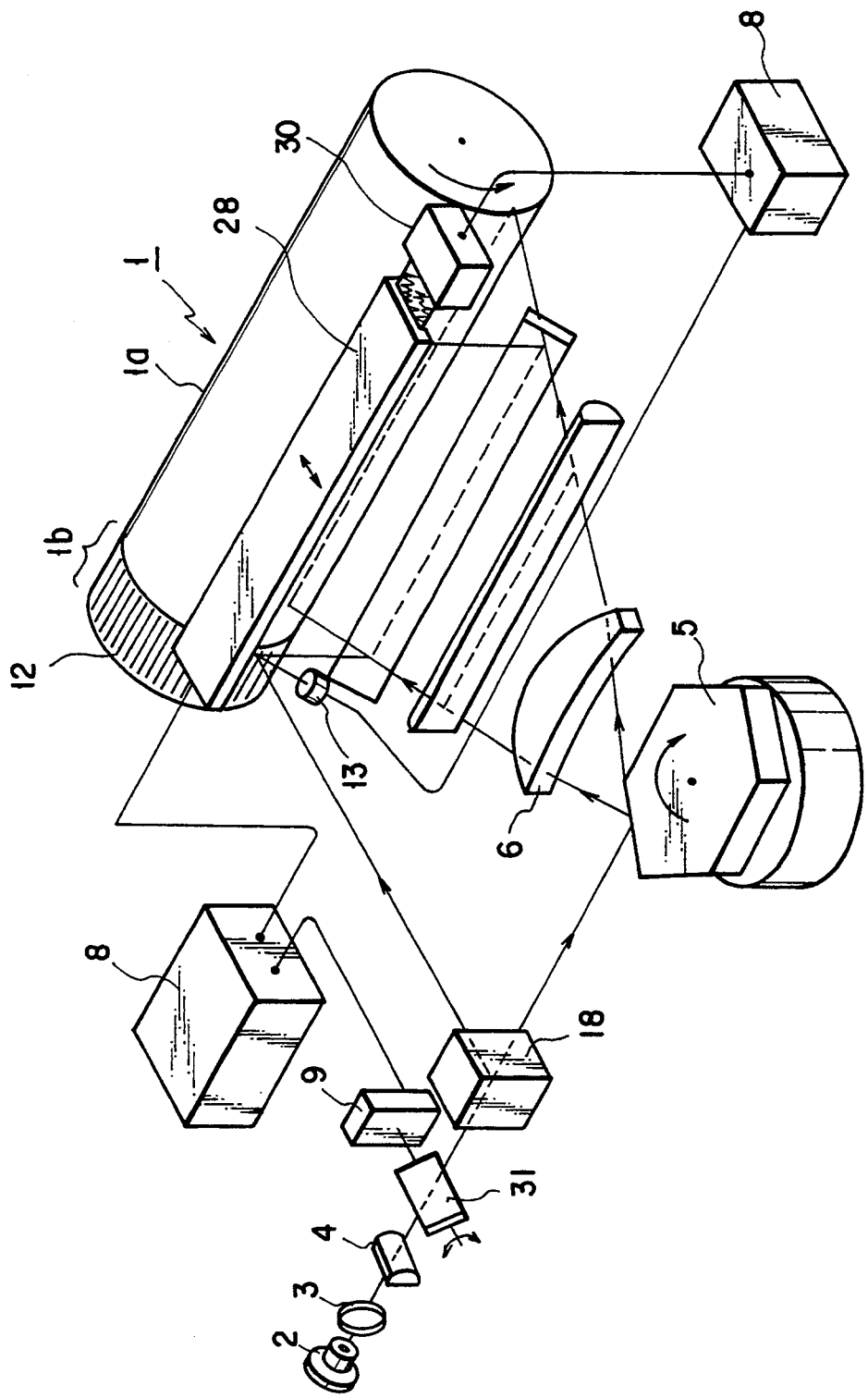
FIG. 33 shows schematically the structure of another embodiment of the invention.

In the embodiment shown in FIG. 27, the rotary encoder 29 is provided on the rotational shaft of the photoconductor 1, thereby detecting a variation in rotational speed. It is possible, however, to form stripe marks 12 on one end portion of the photoconductor, as shown in FIG. 33, and detect a variation in rotational speed by using a recording beam.

Specifically, the beam is separated by a beam splitter 18 into a beam traveling towards the polygonal mirror 5 and a beam traveling towards the marks 12. The beam reflected by the region of the marks 12 enters a photo detective element 13. Since the reflectance characteristic of the region with marks differs from that of the region without marks, reflected light components with different reflection intensities are obtained from the portion having equidistantly arranged marks. Since reflection light components with different reflection intensities are obtained in accordance with the rotation of the photoconductor, the rotational speed can be measured on the cycle of variation of light quantity. In this manner, while the rotational speed is measured, the variation in rotational speed is detected and the scale 28 is moved in accordance with the variation in rotational speed.

This embodiment is advantageous with respect to cost, since an expensive rotary encoder can be dispensed with. The photoconductor 1a and the mark section 1b, which are formed separately, may be coupled as one body only if the movement of these is synchronized. The shapes of the marks may have "-shape", "staggered shape" or "stripe shape" with different spatial frequencies, as shown in FIGS. 28A to 28D.

Embodiment 11

Figure 34:
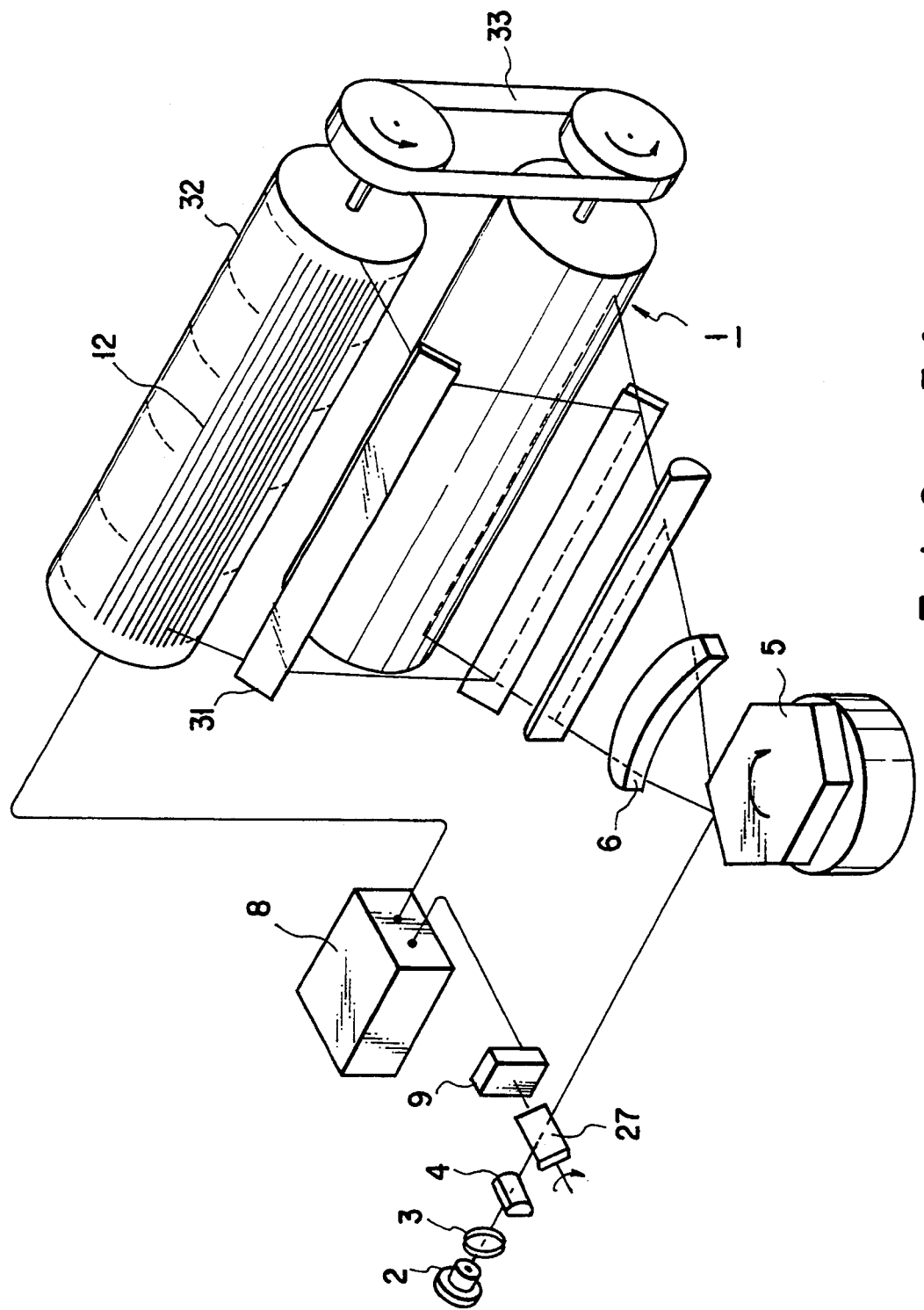
FIG. 34 shows schematically the structure of an embodiment of the invention, wherein an error observation roller is further provided.

In an embodiment of the scanning optical apparatus shown in FIG. 34, a photoconductor 1 and a roller 32 are connected by a belt 33. By referring to marks 12 on the roller 32, the scanning position of the beam is corrected. The "stripe" marks 12 indicating reference beam scanning position are provided on the roller 32.

Figure 35:
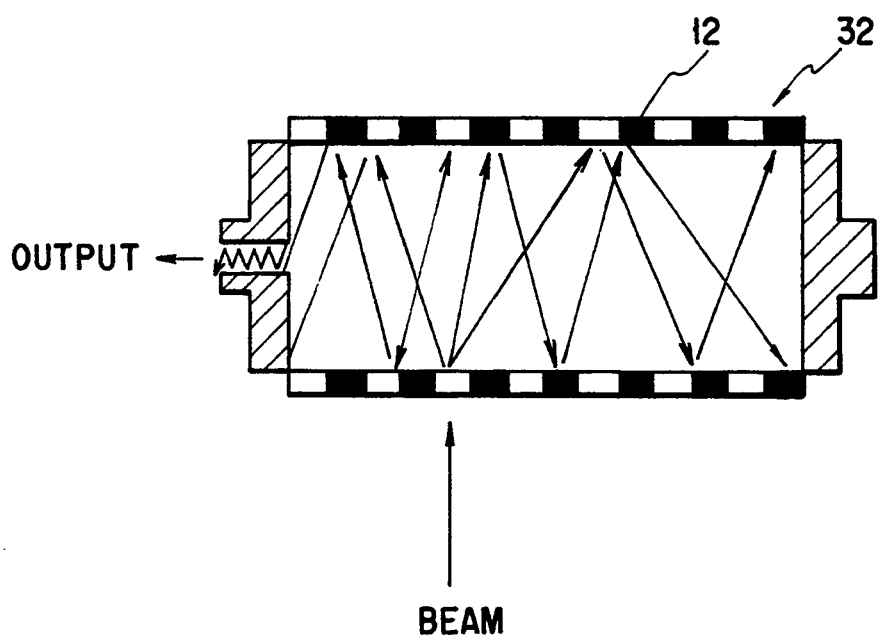
FIG. 35 is a cross-sectional view of a roller showing the structure of the roller having a surface provided with marks, and illustrating a beam subjected to internal irregular reflection.

FIG. 35 illustrates a method of obtaining an output signal when a beam enters the roller 32. The peripheral wall of the roller 32 is made of a light-transmissive material such as glass. The inner peripheral surface of the roller 32 is a mirror surface for causing a beam to reflect or scatter. The beam, which has entered the roller 32, is repeatedly reflected within the roller 32 and is emitted from an emission opening formed in an end face of the roller 32. A photo detective element (not shown) is provided in emission opening. According to this structure, the beam from the entire scanning width can be converted to an electric signal by only one photo detective element.

The apparatus of this embodiment is cost-effective, since an expensive rotary encoder is not used. In FIG. 34, the torque of the photoconductor 1 is transmitted to the roller 32 by means of the belt 33. Alternatively, it is possible to transmit the torque by adopting a driving system wherein rotational shafts are coupled by means of a plurality of gears, or a driving system wherein gears are interconnected by means of a chain.

Figure 36:
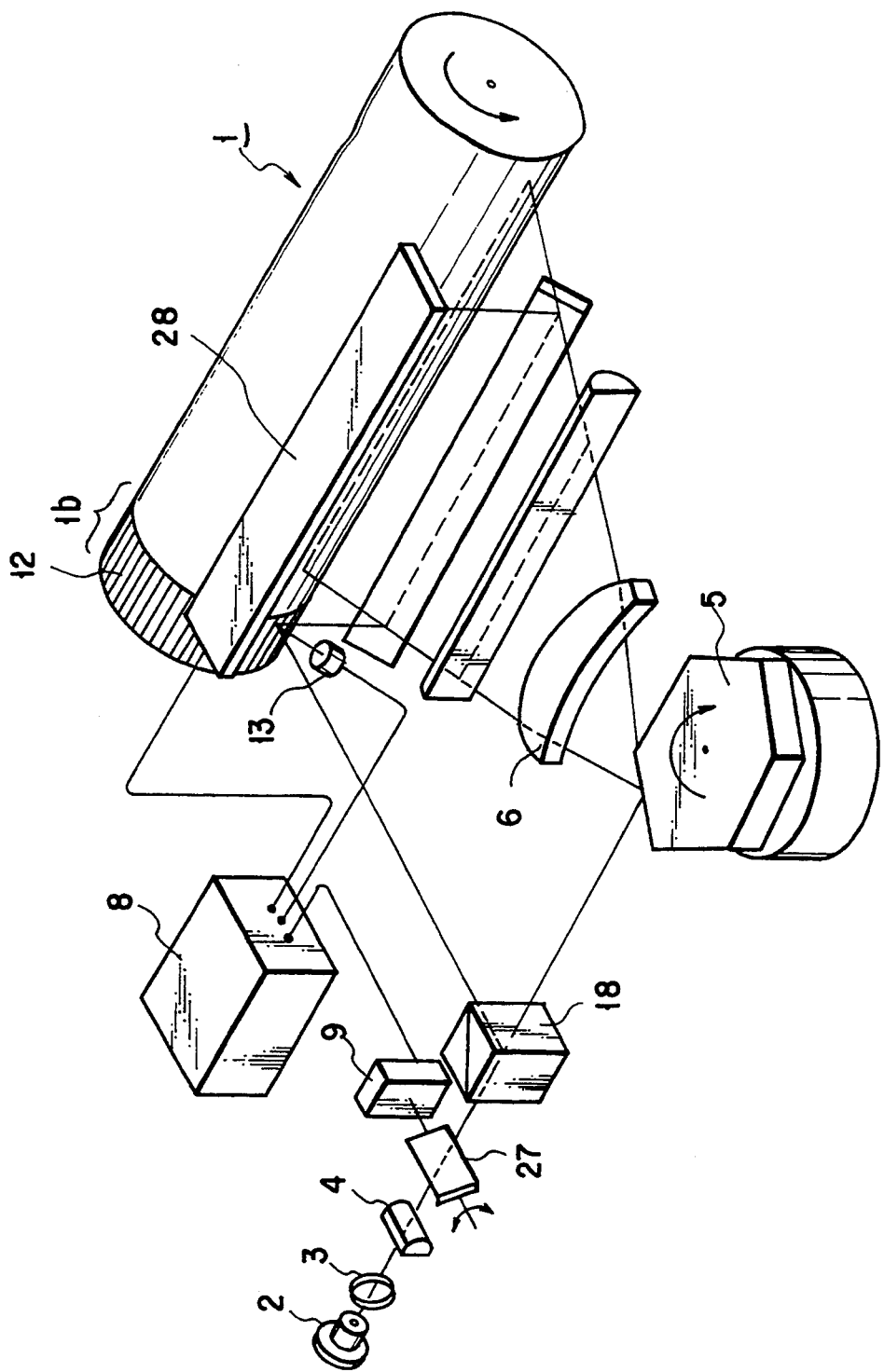
FIG. 36 shows schematically the structure of a modification of this embodiment.

It is possible to constitute the scanning error correction system by excluding the rotary encoder used in the preceding embodiment, as shown in FIG. 36. Fine stripe marks 12 are provided on an end portion 1b of the photoconductor 1. A beam is irradiated on the marks 12, and the cycle of variation of reflected light intensity is measured, thereby detecting the rotational speed of the photoconductor or rotary drum 1. The rotational speed of the drum is measured constantly by the controller 8. If any variation in rotational speed is detected, the rotational speed of the drum is controlled in such a direction as to cancel the variation in rotational speed by means of the signal processing circuit in the controller 8. On the other hand, in order to detect a scanning position error due to the optical system such as "face inclination" of the polygonal mirror, part of the scanning beam is illuminated on the scale 28 and a variation thereof is detected.

On the basis of error signals obtained by the two (mechanical and optical) error detection means, the scanning position variation due to the rotational speed variation of the photoconductor 1 and the scanning position variation due to optical components such as "face inclination" of the polygonal mirror 5 are detected individually. Thus, the controller 8 performs synthetic correction processing.

Embodiment 12

In the above embodiment, reflected light or transmitted light from the region with marks indicating the optimal scanning position is received by the photo detective element and converted to an electric signal, thereby detecting an error or a deviation from the optimal scanning position. It is also possible to adopt another system wherein the quantity of a charge on the surface of the photoconductor 1, on which the beam is irradiated, is measured, and the error of the irradiation position is detected on the basis of the quantity of charge.

An embodiment of this error correction system is shown in FIG. 37. In FIG. 37, a photosensitive layer (not shown) is provided on the mark section 1b, too. Thus, the quantity of charge on the region where the beam has been irradiated is measured. By irradiating the beam on the surface of the photoconductor 1 and the mark section 1b with marks 12, the quantity of incident light on the photoconductor 1 is varied and accordingly the quantity of charge on the photoconductor 1 is varied. Thus, an error signal indicating an error between the optimal scanning position and the actual scanning position is obtained.

The principle of this system is illustrated in FIG. 38. Specifically, the drum with the marks is electrified with a charge q by a discharge apparatus 34, so that the surface potential becomes uniform. As is shown in FIG. 39, a plurality of recesses 35 are formed in an aluminum support member 10 in the sub scanning direction, and a photosensitive layer 11 is uniformly formed on the support member 10. The photosensitive layer 11 may be formed of, e.g. "organic photosensitive material" or "inorganic photosensitive material." The thickness of the photosensitive layer 11 varies in accordance with the recesses 35 of the support member 27. The quantity of charge on the surface of thick portions of the photosensitive layer 11 is small, whereas that on the surface of thin portions of the layer 11 is large.

Figure 40:
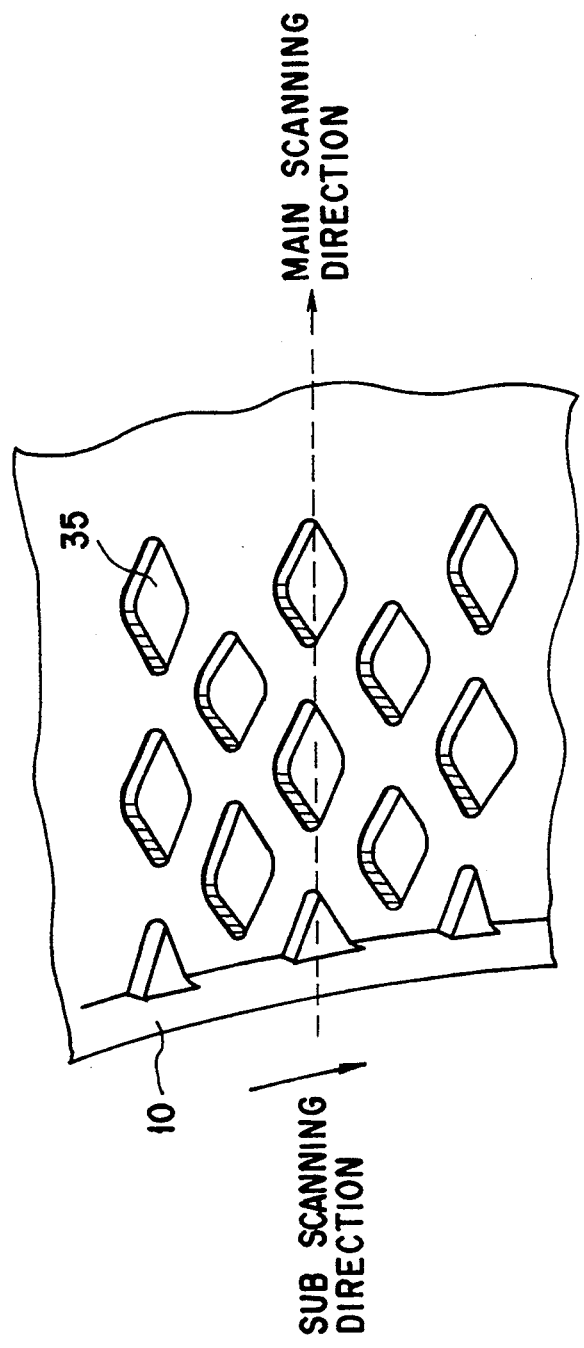
FIG. 40 is a partially enlarged view of an example of a pattern of holes formed in an electrically conductive substrate.

In FIG. 39 showing a cross section of the photoconductor 1, surface charge is lost in that part of the photoconductor, on which the beam is irradiated, and the charge of the opposite polarity collected in the electrically conductive support member 10 is caused to flow to the ground potential. By causing the charge to flow through a resistor R, an electric signal Vout can be obtained. At this time, if the beam is irradiated on the surface of the part of the photoconductor 1, which corresponds to the recesses 35 of the support body 10, a lowest electric current flows to the ground potential, and also the output signal Vout is minimum. For example, if it is supposed that the recesses 35 coincide with the optimal scanning position of the beam, the direction of the beam is varied so as to minimize the current flowing to the ground potential. Since the current flowing to the ground potential is very small, the pattern of marks is devised to increase S/N. That is, as shown in FIG. 40, if each recess 35 of the aluminum drum is formed in a "substantially rhombic shape", and recesses 35 are cyclically formed in both main and sub scanning directions, an electric signal with high S/N can be obtained by a band-pass filter.

Embodiment 13

FIG. 41 shows a color laser printer to which the scanning optical apparatus of the present invention is applied. In this embodiment, only a pair of the photoconductor and the laser scanning optical system are provided. An image signal is recorded on the photoconductor individually for each color. Then, an image is developed by a developing device and transferred to an intermediate transfer medium. Then, images of various colors are superposed and recorded on the intermediate transfer medium. In general, in this type of laser printer, "color blurring (i.e. locational error of each color pixel)" is a main problem. There are two types of "color blurring" in general; "color blurring" at the time of transfer of images on the intermediate transfer medium, and "color blurring" at the time of writing by means of laser beam. The latter "color blurring" is due to the scanning position error (i.e. scanning line distoration) of the laser beam resulting from a variation in rotational speed of the photoconductor, and due to slight difference in write start position of respective color images. In the present invention, images of respective colors can be written at predetermined positions on the photoconductor; thus, "color blurring" can be suppressed at the time of writing by means of the laser beam.

Figure 42:
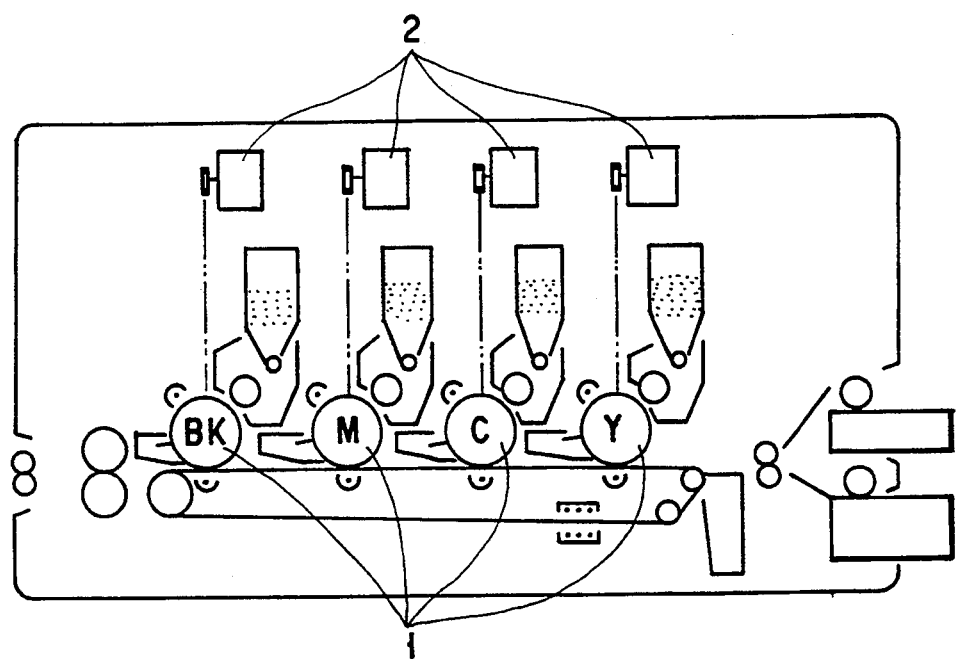
FIG. 42 shows a structure of part of a color laser printer to which the scanning optical apparatus of the invention is applied.
Figure 43:
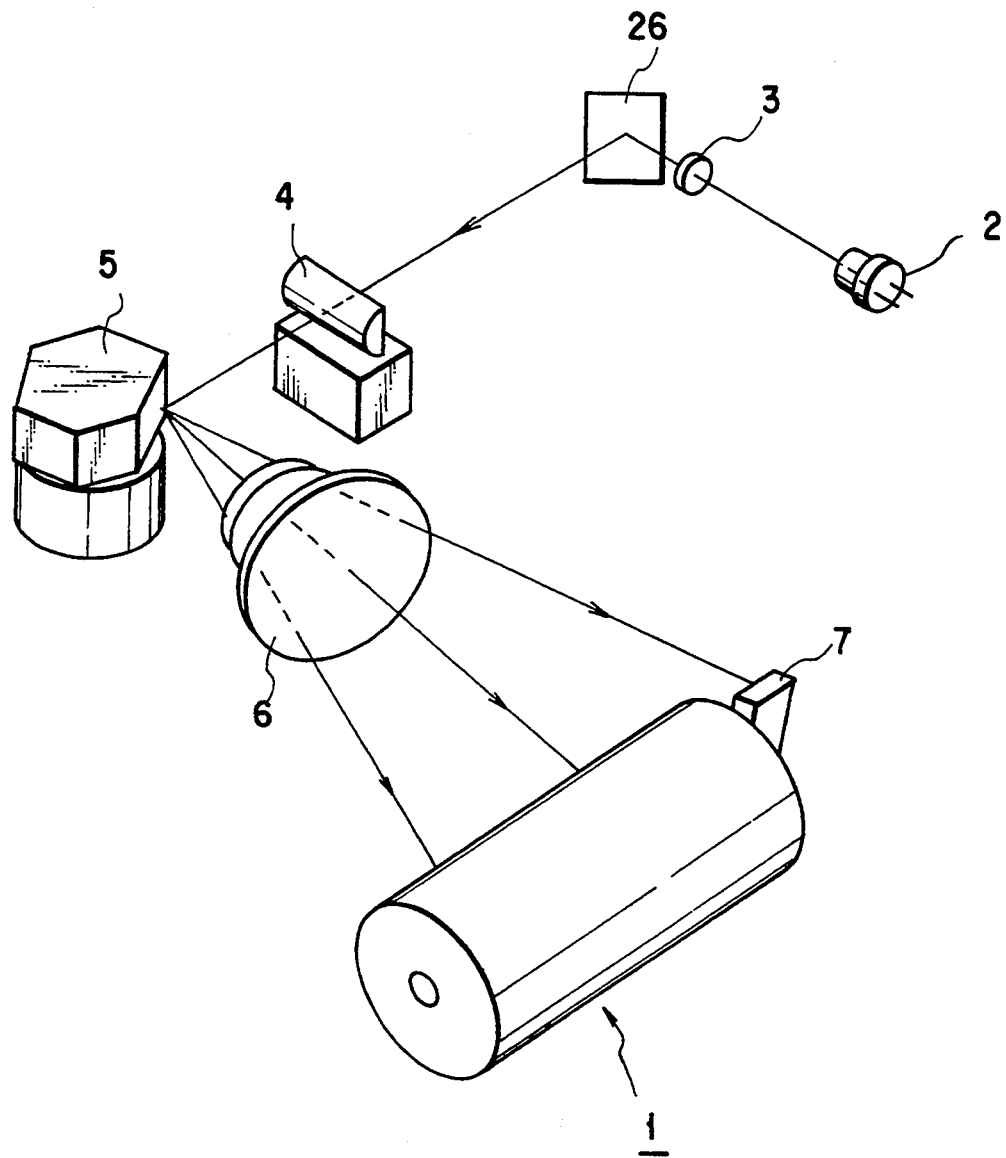
FIG. 43 shows schematically the structure of a conventional scanning optical apparatus.

Other types of color laser beam printers have been proposed. In these printers, too, the present invention is effective. FIGS. 41 and 42 show the structures of color laser beam printers having pairs of photoconductor 1 and semiconductor laser 2 for respective colors: cyan (C), magenta (M), yellow (Y) and black (BK). In addition to the above causes, the "color blurring" occurring in the printer with this structure is partly due to a "laser scan deviation" on the photoconductor. The laser scanning system is slightly bent on the photoconductor, if the laser beam deviates from the optical axis. If the degree of "bending" differs between the optical systems, "color blurring" occurs on the formed color images. In this embodiment, the problem of "bending" can be solved if marks indicating the beam scanning position are formed on the recording region on each photoconductor and real-time correction is made to scan the laser beam in parallel to the rotational axis of the photoconductor.

The above description is directed to the laser beam printers; however, the present invention is also applicable to an image input scanner and various exposure apparatuses.

As has been described above, according to each embodiment of the present invention, there is provided a scanning optical apparatus having the correction system which successively detects the scanning position of the beam on the photoconductor, determines an error from the optimal beam scanning position, and corrects the error. Thereby, scanning position errors due to not only the optical system but also the mechanical system can be corrected in real time.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A scanning optical apparatus comprising:
   beam generating means for generating a beam, a photoconductor having a portion irradiated and sensitized by the beam generated by said beam generating means, optical means for scanning the beam in one direction on a photoconductive surface of said photoconductor, driving means for driving said optical means, and means for moving said photoconductor in a direction perpendicular to the direction of scan,
   further comprising:
   a support member moving in synchronism with the moving speed of said photoconductor;

a mark section having a plurality of marks with a reflectance characteristic and a transmission characteristic different from those of the surface of said photoconductor, said mark being provided integrally on the surface of said support member;

at least two photoelectric conversion means for detecting a light quantity of the beam irradiated on the surface of said mark section and converting the detected light quantity into corresponding electric signals;

means for generating an error signal indicating a position error from the optimal scanning position of the beam, on the basis of the electric signals corresponding to said mark section; and means, connected to said driving means and said photoelectric conversion means, for correcting the scanning position of the beam on the basis of the error signal.

2. The apparatus according to claim 1, wherein said marks are formed of an electrically conductive material.

3. The apparatus according to claim 1, wherein said marks have a selected reflectance characteristic, whereby said marks have a reflectance different from that of the region other than said mark section, in relation to the wavelength of the beam.

4. The apparatus according to claim 1, wherein said marks are provided at positions corresponding to a scanning pitch of the beam, and arranged in stripes, in a staggered manner or in a substantially staggered manner, with predetermined pitches in a scanning direction of the beam and a direction perpendicular to the scanning direction.

5. The apparatus according to claim 1, wherein said mark is a continuous stripe extending in a direction perpendicular to the scanning direction of the beam on said photoconductor at a predetermined angle, with the width in the scanning direction varying at a predetermined rate.

6. The apparatus according to claim 1, wherein said marks are formed over the entire region of the photoconductive surface of said photoconductor along the beam scanning direction, the light quantity of the beam irradiated on said photoconductive surface increases at a time of forming picture points, and the photoelectric conversion means is arranged in a position facing the entire region of the photoconductive surface.

7. The apparatus according to claim 1, wherein the beam emitted from said beam generating means is irradiated on the surface of said photoconductor substantially perpendicularly, by means of said optical means and said driving means for driving said optical means.

8. A scanning optical apparatus comprising:
a plurality of beam generating means for generating beams, a photoconductor having a portion irradiated and sensitized by the beams generated by said beam generating means, optical means for scanning the beams in one direction on a photoconductive surface of said photoconductor, driving means for driving said optical means, and means for moving said photoconductor in a direction perpendicular to the direction of scan, further comprising:
beam compounding means for compounding the beams into a single beam;
scanning means for scanning the compounded beam in two-dimensional directions on a to-be-scanned surface of said photoconductor;

a mark section having a plurality of marks with a reflectance characteristic and a transmission characteristic different from those of the photoconductive surface of said photoconductor, said mark being provided at predetermined portions on the photoconductive surface;

at least two photoelectric conversion means for detecting a light quantity of the beam irradiated on the surface of said mark section and converting the detected light quantity into corresponding electric signals;

means for generating an error signal indicating a position error from an optical scanning position of the beam, on the basis of the electric signals corresponding to said mark section; and control means, connected to said driving means and said photoelectric conversion means, for correcting the scanning position of the beam on the basis of the error signal, and suitably controlling an output beam from said corresponding beam generating means.

9. The apparatus according to claim 8, wherein said beam generating means are constituted such that the light quantity of the beams emitted from light sources has a non-linear relationship with the value of the driving current for the light sources.

10. A scanning optical apparatus comprising:
beam generating means for generating a beam; a photoconductor having a portion sensitized by irradiation of the beam; scanning means for scanning the beam in one direction on a to-be-scanned surface of said photoconductor; and means for moving a support member for supporting said photoconductor in a direction substantially perpendicular to the scanning direction, further comprising:
means for measuring the speed of movement of said photoconductor;
a reference scale situated in parallel to the scanning direction, at a predetermined distance from said photoconductor;
means for guiding and irradiating the beam generated by said beam generating means onto said reference scale;
a plurality of marks arranged regularly on the surface of said reference scale and having a reflectance characteristic different from that of the surface of said reference scale;
photoelectric conversion means for measuring a light quantity of the beam incident on said reference scale and converting the measured light quantity into an electric signal;
means for generating an error signal indicating the position error of the beam on the basis of the electric signal corresponding to said reference scale; and
control means, connected to the means and said photoelectric conversion means, for suitably correcting the scanning position of the beam on the basis of the error signal.

11. A scanning optical apparatus comprising:
beam generating means for generating a beam; a photoconductor having a portion sensitized by irradiation of the beam; scanning means for scanning the beam in one direction on a photoconductive surface of said photoconductor; and means for moving a support member for supporting said photoconductor in a direction substantially perpendicular to the scanning direction, further comprising:

speed variation detecting means for measuring a speed of movement of said photoconductor, and detecting a variation in speed of movement of said photoconductor;

a reference scale situated in parallel to the scanning direction, at a predetermined distance from said photoconductor, and having on said photoconductor surface a plurality of marks with a reflectance characteristic and a transmission characteristic different from those of said surface material of said photoconductor;

means for guiding and irradiating the beam generated by said beam generating means onto said reference scale;

scanning position varying means for varying a scanning position of the beam on said reference scale by moving said reference scale on the basis of a signal from said speed variation detecting means;

photoelectric conversion means for measuring a light quantity of the beam incident on said reference scale and converting the measured light quantity into an electric signal;

means for generating an error signal indicating the position error of the beam on the basis of the electric signal corresponding to said reference scale; and control means, connected to said means for generating an error signal and said photoelectric conversion means, for suitably correcting the scanning position of the beam on the basis of the error signal.

12. A scanning optical apparatus comprising:

beam generating means for generating a beam; a photoconductor having a portion sensitized by irradiation of the beam; a support member for supporting said photoconductor; optical means for scanning the beam in one direction on a photoconductive surface of said photoconductor; means for moving said photoconductor in a direction substantially perpendicular to the scanning direction; driving means for driving the optical means; and means for applying a uniform surface charge to the photoconductive surface, further comprising:

means for measuring the charge on a to-be-scanned surface irradiated by the beam, and converting the measured value of the charge into an electric signal;

means for generating an error signal indicating the position error of the beam on the basis of the electric signal; and control means for suitably correcting the scanning position of the beam on the basis of the error signal.

13. The apparatus according to claim 12, wherein said support member is formed of a predetermined metallic material capable of being electrified, and a plurality of concaves and convexes or recesses of a predetermined pattern are arranged on the surface of said support member.

* * * * *